(12) United States Patent
Jang et al.

(10) Patent No.: US 9,176,362 B2
(45) Date of Patent: Nov. 3, 2015

(54) OPTICAL PATH ADJUSTING DEVICE AND PHOTOGRAPHING APPARATUS INCLUDING THE SAME

(75) Inventors: Cheol-eun Jang, Suwon-si (KR); Hee-seung Choi, Gunpo-si (KR); Kun-woo Lee, Suwon-si (KR); Woo-jong Cho, Suwon-si (KR); Sung-wook Choi, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 13/613,897

(22) Filed: Sep. 13, 2012

(65) Prior Publication Data

US 2013/0258056 A1    Oct. 3, 2013

(30) Foreign Application Priority Data

Mar. 30, 2012  (KR) ........................ 10-2012-0033347

(51) Int. Cl.
| | |
|---|---|
| *H04N 13/02* | (2006.01) |
| *G02F 1/13* | (2006.01) |
| *G02B 26/00* | (2006.01) |
| *G03B 11/00* | (2006.01) |
| *G03B 35/02* | (2006.01) |

(52) U.S. Cl.
    CPC ............... *G03B 11/00* (2013.01); *G03B 35/02* (2013.01)

(58) Field of Classification Search
    CPC .... G03B 11/00; G03B 35/02; H04N 13/0285; H04N 13/0289; H04N 13/0292
    See application file for complete search history.

(56) References Cited

U.S. PATENT DOCUMENTS

| | | | |
|---|---|---|---|
| 4,290,675 A * | 9/1981 | Beiser | 396/324 |
| 5,892,994 A | 4/1999 | Inaba | |
| 6,269,223 B1 | 7/2001 | Lo et al. | |
| 6,466,746 B2 | 10/2002 | Inaba | |
| 6,546,208 B1 | 4/2003 | Costales | |
| 6,807,295 B1 | 10/2004 | Ono | |
| 7,019,780 B1 | 3/2006 | Takeuchi et al. | |
| 2011/0293261 A1* | 12/2011 | Lee et al. | 396/323 |
| 2012/0057859 A1* | 3/2012 | Byon et al. | 396/510 |
| 2012/0082447 A1* | 4/2012 | Jung et al. | 396/213 |
| 2013/0027524 A1* | 1/2013 | Park et al. | 348/49 |
| 2013/0258056 A1* | 10/2013 | Jang et al. | 348/46 |

FOREIGN PATENT DOCUMENTS

KR    10-2012-0035043 A    4/2012

* cited by examiner

*Primary Examiner* — W B Perkey
(74) *Attorney, Agent, or Firm* — Drinker Biddle & Reath LLP

(57) ABSTRACT

An optical adjusting device includes: a rotating unit that includes and rotates about a through-hole through which light passes; at least one moving unit that is movably disposed relative to the rotating unit and is linearly movable between an advance position corresponding to the through-hole and a retreat position outside the through-hole; a transmitting unit that is disposed between the rotating unit and the moving unit and transmits a rotational force of the rotating unit to the moving unit; and an optical unit that is disposed on the moving unit and blocks at least part of light passing through the through-hole.

17 Claims, 17 Drawing Sheets

OPTICAL PATH ADJUSTING DEVICE AND PHOTOGRAPHING APPARATUS INCLUDING THE SAME

CROSS-REFERENCE TO RELATED PATENT APPLICATION

This application claims the benefit of Korean Patent Application No. 10-2012-0033347, filed on Mar. 30, 2012, in the Korean Intellectual Property Office, the disclosure of which is incorporated herein in its entirety by reference.

BACKGROUND

Various embodiments of the invention relate to an optical path adjusting device and a photographing apparatus including the same, and more particularly, to a photographing apparatus capable of selectively capturing a three-dimensional (3D) image or a two-dimensional (2D) image and an optical path adjusting device for the photographing apparatus.

Three-dimensional (3D) images express a stereoscopic effect observed by a person who looks at a subject with his/her eyes. Although 3D images have historically been used for medical equipment and the like, many video products using 3D images have recently been produced and 3D television technology capable of being supplied to homes is also being rapidly developed.

In order to provide a 3D image, since it is necessary to simultaneously show images captured at different angles to both eyes of a person, a photographing apparatus for capturing a 3D image has an operating structure different from that of a photographing apparatus for capturing a 2D image.

Various types of apparatuses are used to capture a 3D image. Since a photographing apparatus for capturing a 3D image has to simultaneously obtain images captured at different angles, an optical structure or a mechanical structure of the photographing apparatus for capturing a 3D image is more complicated than that of a photographing apparatus for capturing a 2D image. Also, since the photographing apparatus for capturing a 3D image may obtain only a 3D image, an additional camera is needed to capture a 2D image.

U.S. Pat. No. 5,892,994 discloses a photographing apparatus for capturing a 3D image. However, if a 2D image is captured by using the photographing apparatus, since an amount of light is reduced by about 60% and an impression of colors is greatly changed due to optical elements used to capture a 3D image, a captured image is dark and unclear.

SUMMARY

Various embodiments of the invention provide a photographing apparatus that may selectively capture a three-dimensional (3D) image or a two-dimensional (2D) image and an optical path adjusting device for the photographing apparatus.

The embodiments may also provide a photographing apparatus that may have a compact structure by minimizing a space needed to arrange and operate elements of an optical path adjusting device for capturing a 3D image.

The embodiments may also provide an optical path adjusting device that may capture a 2D image having high quality by moving an optical unit for capturing a 3D image away from an optical path to secure enough light when a 2D image is to be captured, and a photographing apparatus including the optical path adjusting device.

According to an embodiment of the invention, there is provided an optical path adjusting device including: a rotating unit that includes and rotates about a through-hole through which light passes; at least one moving unit that is movably disposed relative to the rotating unit and is linearly movable between an advance position corresponding to the through-hole and a retreat position outside the through-hole; a transmitting unit that is disposed between the rotating unit and the moving unit and transmits a rotational force of the rotating unit to the moving unit; and an optical unit that is disposed on the moving unit and blocks at least part of light passing through the through-hole.

The moving unit may include a first slider and a second slider that are movable toward each other or away from each other, wherein the first slider and the second slider close the through-hole at the advance position by contacting each other and open the through-hole at the retreat position by moving away from the through-hole.

The optical unit may include a first optical unit that is disposed on the first slider and a second optical unit that is disposed on the second slider, wherein the first optical unit and the second optical unit pass light in different optical ranges.

The optical unit may include a first liquid crystal device and a second liquid crystal device that are respectively disposed on the first slider and the second slider and operate by receiving an external signal to pass or block light, wherein the first liquid crystal device and the second liquid crystal device pass light therethrough at different times.

The rotating unit may further include a gear surface that is disposed in a circumferential direction, the first slider and the second slider respectively may include a first linear gear and a second linear gear that extend in a direction in which the first slider and the second slider linearly move, and the transmitting unit may include a first transmission gear that is coupled to and rotates between the gear surface and the first linear gear and a second transmission gear that is coupled to and rotates between the gear surface and the second linear gear.

The optical path adjusting device may further include a support unit that movably supports the first slider and the second slider.

The support unit may include at least one stopper that limits motions of the first slider and the second slider.

The optical path adjusting device may further include a first magnetic portion that is disposed on the first slider, and a second magnetic portion that is disposed on the second slider and applies an attractive magnetic force to the first magnetic portion.

The optical path adjusting device may further include a sensing unit that detects positions of the first slider and the second slider.

The optical path adjusting device may further include a driving unit that generates a driving force, and an intermediate gear that is coupled to the gear surface of the rotating unit and transmits the driving force of the driving unit to the rotating unit.

The rotating unit may include a plurality of long hole pairs each of which includes a first long hole and a second long hole that extend outward in curves, the transmitting unit may include a plurality of transmission plates that include a first sliding protrusion and a second sliding protrusion respectively coupled to the first long hole and the second long hole, and a third long hole extending in curves with respect to the first long hole and the second long hole, the first slider and the second slider may include third sliding protrusions that are inserted into the third long hole of each of the plurality of transmission plates, and the optical path adjusting device may further include a transmission plate guide unit that includes a fourth long hole and a fifth long hole that extend outside the through-hole and slidably support the first sliding protrusion and the second sliding protrusion passing through the first long hole and the second long hole.

According to another embodiment of the invention, there is provided a photographing apparatus including: an optical path adjusting device including: a rotating unit that includes and rotates about a through-hole through which light passes; at least one moving unit that is movably disposed relative to the rotating unit and is linearly movable between an advance position corresponding to the through-hole and a retreat position outside the through-hole; a transmitting unit that is disposed between the rotating unit and the moving unit and transmits a rotational force of the rotating unit to the moving unit; and an optical unit that is disposed on the moving unit and blocks at least part of light passing through the through-hole; an imaging device that converts light passing through the optical path adjusting device into an electrical signal; and a control unit that performs photographing by controlling the imaging device, and selects and operates in a 2D photographing mode in which one image introduced through the through-hole is captured when the moving unit is located at the retreat position or a 3D photographing mode in which a plurality of images introduced through the plurality of optical units are captured when the moving unit is located at the advance position.

The optical unit may include optical filters that pass light in different optical ranges, wherein the photographing apparatus further includes a light-dividing filter that is disposed in front of the imaging device and divides light introduced after passing through the optical unit.

The photographing apparatus may further include a main body that receives the optical path adjusting device, and an angle adjusting unit that rotates the optical path adjusting device relative to the main body, wherein the control unit adjusts a rotational orientation of the optical path adjusting device relative to the main body by controlling the angle adjusting unit.

The photographing apparatus may further include a rotation sensing unit that detects a rotational orientation of the main body, wherein the control unit controls the angle adjusting unit based on a detection signal of the rotation sensing unit.

According to another embodiment of the invention, there is provided an optical path adjusting device including: a rotating unit that includes and rotates about a through-hole through which light passes; a first slider and a second slider that are coupled to the rotating unit and are linearly movable relative to the rotating unit between an advance position corresponding to the through-hole and a retreat position outside the through-hole; a fixing unit that rotatably supports the rotating unit and includes guide portions that extend in curves in a circumferential direction outside the through-hole and guide protrusions of the first slider and the second slider; and a plurality of optical units that are respectively disposed on the first slider and the second slider and block part of light passing through the through-hole, wherein the first slider and the second slier are disposed on a first straight line crossing the through-hole at the advance position, and the first slider and the second slider are disposed on a second straight line crossing the through-hole and the first straight line at the retreat position.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

As used herein, the term "and/or" includes any and all combinations of one or more of the associated listed items. Expressions such as "at least one of," when preceding a list of elements, modify the entire list of elements and do not modify the individual elements of the list.

Various embodiments of the invention will now be described more fully with reference to the accompanying drawings.

Figure 1:
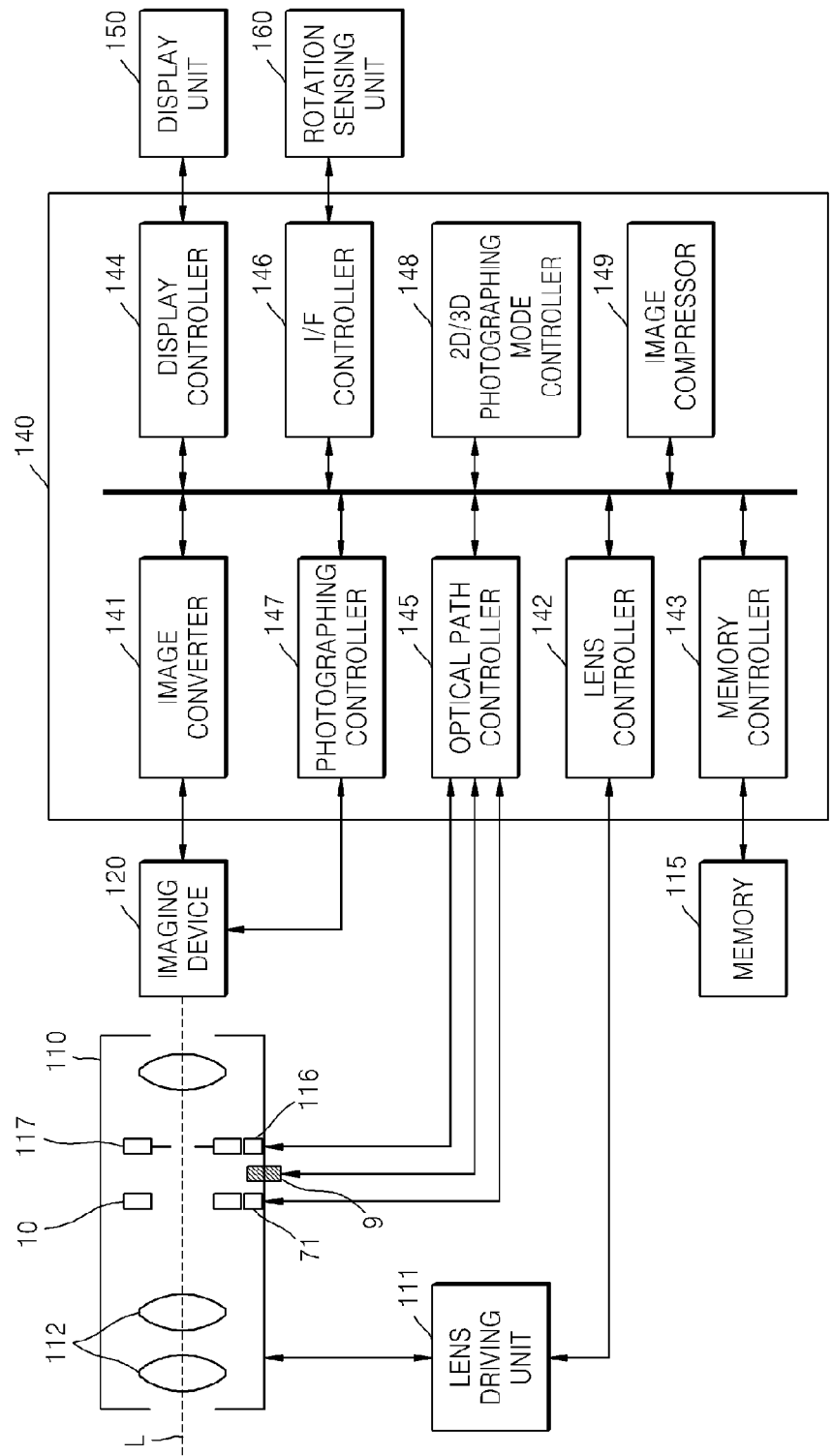
FIG. 1 is a block diagram illustrating a relationship between elements of a photographing apparatus including an optical path adjusting device, according to an embodiment of the invention.

FIG. 1 is a block diagram illustrating a relationship between elements of a photographing apparatus including an optical path adjusting device 10, according to an embodiment of the invention.

Referring to FIG. 1, the photographing apparatus includes the optical path adjusting device 10, an imaging device 120 that converts light passing through the optical path adjusting device 10 into an electrical signal, and a control unit 140 that selects and operates in a two-dimensional (2D) photographing mode or a three-dimensional (3D) photographing mode by controlling the imaging device 120.

The optical path adjusting device 10 may be disposed on an optical path of light that passes through a plurality of lenses 112 and then is incident on the imaging device 120, and may completely open the optical path or block at least part of the light by closing at least a portion of the optical path.

The imaging device 120 may capture a 2D image or a 3D image in connection with an operation of the optical path adjusting device 10. The photographing apparatus may be embodied as various devices such as a digital still camera for capturing a still image and a digital video camera for capturing a motion picture.

The imaging device 120 captures an image of a subject and converts the image into an electrical signal. The electrical signal generated by the imaging device 120 is converted into image data by an image converter 141. A photographing controller 147 of the control unit 140 performs a photographing operation by controlling the imaging device 120.

The plurality of lenses 112 and the optical path adjusting device 10 constitute an optical system that is disposed in front of the imaging device 120. A barrel 110 including the plurality of lenses 112 and the optical path adjusting device 10 forms an image from external light on an imaging surface of the imaging device 120.

The lenses 112 are arranged such that an interval between the lenses 112 may vary. When the interval between the lenses 112 varies, a zoom magnification or a focus may be adjusted. The lenses 112 are arranged along an optical axis L. The optical axis L refers to a virtual straight line connecting optical centers of the lenses 112.

Positions of the lenses 112 may be changed as the lenses 112 are driven by a lens driving unit 111 including a driving unit such as a zoom motor (not shown). The lenses 112 may include a zoom lens for magnifying or reducing a size of a subject, and a focus lens for adjusting a focus on the subject.

The lens driving unit 111 operates by receiving a control signal from a lens controller 142 of the control unit 140, and controls positions of the lenses 112 so that the lenses 112 have any one of a plurality of magnifications.

The imaging device 120 including a photoelectric conversion device such as a charge-coupled device (CCD) or a complementary metal-oxide-semiconductor (CMOS) converts image light passing through the optical path adjusting device 10 and then incident thereon into an electrical signal. The imaging device 120 is driven according to a control signal received from the photographing controller 147.

The image converter 141 may convert the electrical signal of the imaging device 120 into image data, to perform image processing on the image data or store the image data in a storage medium such as a memory 115. For example, the image converter 141 may convert the electrical signal of the imaging device 120 into RGB data and convert the RGB data into raw data such as a YUV signal including a luminance (Y) signal and chrominance (UV) signals.

Also, a process of converting the electrical signal of the imaging device 120 performed by the image converter 141 may include a step of reducing driving noise included in the electrical signal of the imaging device 120 by using a correlated double sampling (CDS) circuit, a step of adjusting a gain of the electrical signal by using an automatic gain control (AGC) circuit after the driving noise included in the electrical signal is reduced, a step of converting an analog signal into a digital signal by using an analog-to-digital (A/D) converter, and a step of performing signal processing such as pixel defect correction, gain correction, white balance correction, or gamma correction on the digital signal. Here, the CDS circuit, the AGC circuit, or the A/D converter may be configured as separate circuits.

The control unit 140 is electrically connected to the imaging device 120, the lens driving unit 111, a display unit 150, the optical path adjusting device 10, an angle adjusting unit 9, the memory 115, and a rotation sensing unit 160, and functions to receive and transmit a control signal from and to the aforementioned elements or process data in order to control operations of the elements.

The control unit 140 includes the image converter 141, the lens controller 142, a memory controller 143, a display controller 144, an optical path controller 145, an input/output interface (I/F) control unit 146, the photographing controller 147, a 2D/3D photographing mode controller 148, and an image compressor 149.

The control unit 140 may be embodied as a microchip or a circuit board including a microchip. The elements included in the control unit 140 may be implemented by software or electronic circuits that are embedded in the control unit 140.

The memory controller 143 controls data to be written to the memory 115 or data or set information to be read from the memory 115.

The memory 115 may be a volatile internal memory. For example, the memory 115 may include a semiconductor memory device such as a synchronous dynamic random access memory (SDRAM). The memory 115 may function as a buffer memory that temporarily stores the image data generated by the image converter 141 and as a working memory that performs data processing.

Alternatively, the memory 115 may be a non-volatile external memory. For example, the memory 115 may be a memory stick, a flash memory such as a secure digital (SD) card or a multimedia card (MMC), a storage device such as a hard disc drive (HDD), or an optical storage device such as a digital versatile disc (DVD) or a compact disc (CD). In this case, the memory 115 may store compressed image data in the form of a joint photographic experts group (JPEG) file, a tagged-image file format (TIF) file, a graphics interchange format (GIF) file, or a personal computer exchange (PCX) file.

The photographing apparatus may include the display unit 150 that displays an image of the image data. The display unit 150 may be embodied as a touchscreen that detects the location of a touch on a surface and generates a signal corresponding to the location of the touch by using a display device such as a liquid crystal display (LCD) or an organic light-emitting display (OLED).

The 2D/3D photographing mode controller 148 sets whether the photographing apparatus operates in a 2D photographing mode for capturing a 2D image or a 3D photographing mode for capturing a 3D image. Operations of the optical path controller 145 and the photographing controller 147 may vary according to the set photographing mode.

An iris 117 for adjusting an amount of light and an iris driving unit 116 are provided on an optical path of the barrel 110. The iris driving unit 116 drives the iris 117 by receiving a control signal applied from the optical path controller 145.

The photographing apparatus may include the rotation sensing unit 160. The rotation sensing unit 160 may be embodied as a gravity sensor. The gravity sensor may detect a rotational orientation of the photographing apparatus. A detection signal of the rotation sensing unit 160 is transmitted to the control unit 140 through the I/F controller 146. The rotation sensing unit 160 may be embodied as an accelerometer or a gyro sensor instead of the gravity sensor.

The photographing apparatus includes the angle adjusting unit 9 that rotates the optical path adjusting device 10. As the angle adjusting unit 9 controls the optical path controller 145 according to a rotational orientation of the photographing apparatus detected by the rotation sensing unit 160, the optical path adjusting device 10 may rotate relative to the photographing apparatus.

Figure 2:
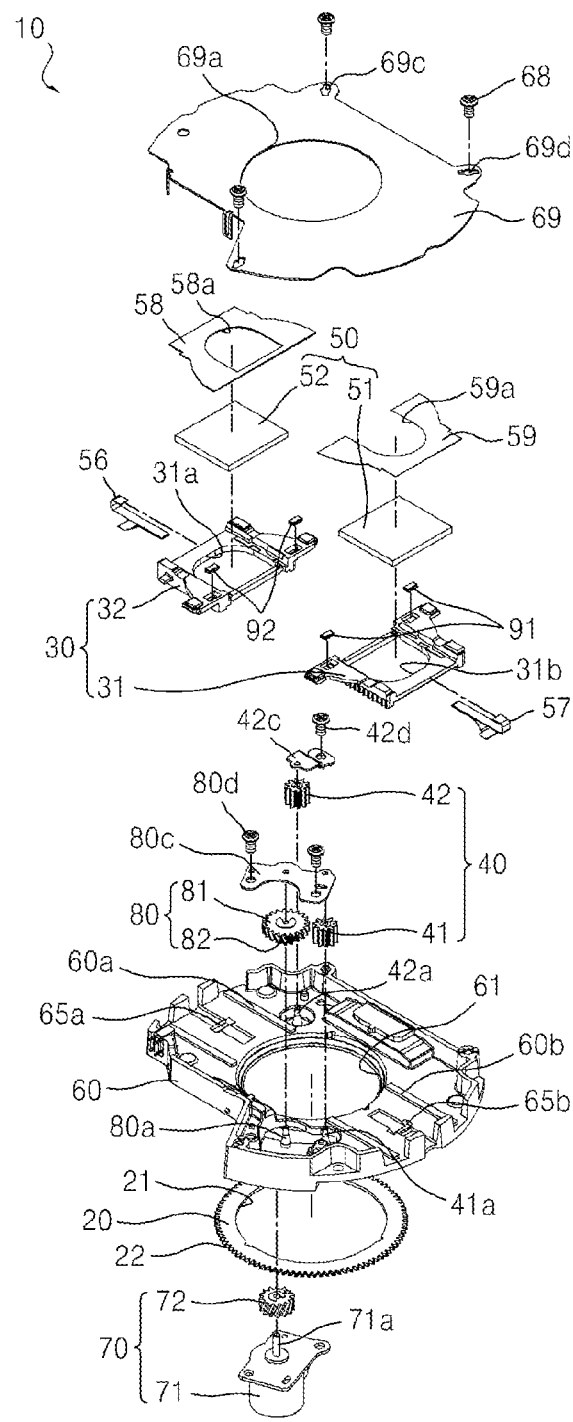
FIG. 2 is an exploded perspective view illustrating elements of the optical path adjusting device of FIG. 1.
Figure 3:
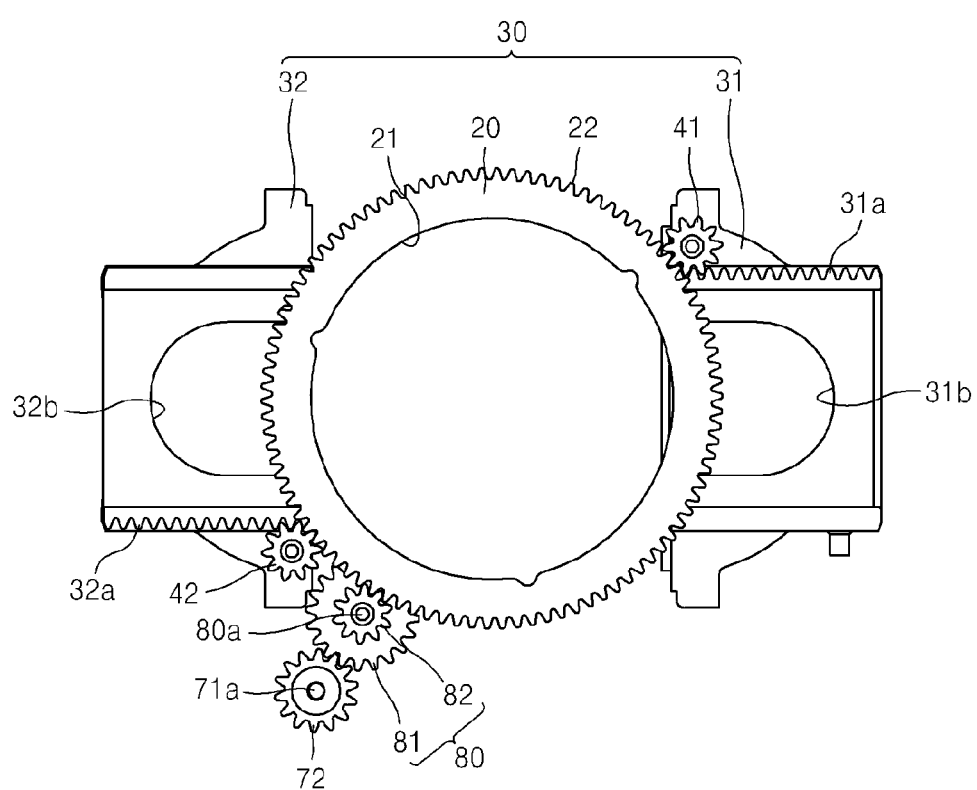
FIG. 3 is a plan view illustrating a state where some elements of the optical path adjusting device of FIG. 2 are assembled.
Figure 4:
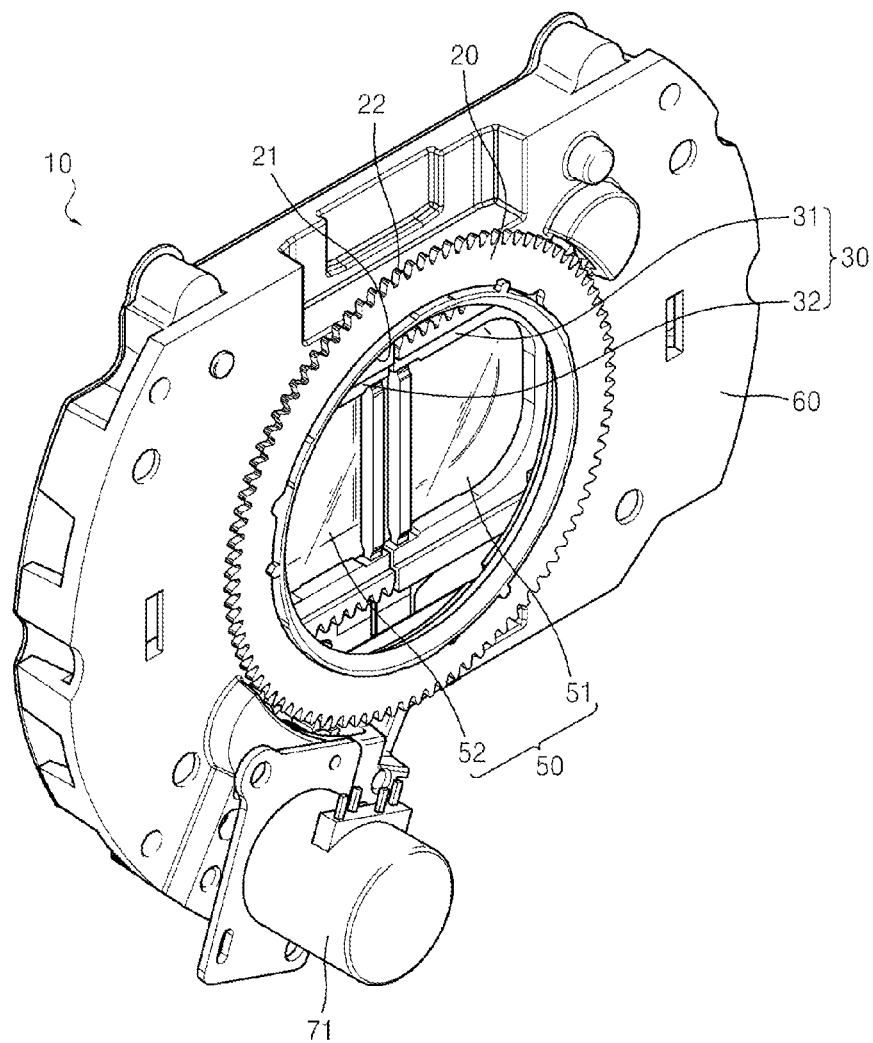
FIG. 4 is a perspective view illustrating a state where the optical path adjusting device of FIG. 2 is assembled.

FIG. 2 is an exploded perspective view illustrating elements of the optical path adjusting device 10 of FIG. 1. FIG. 3 is a plan view illustrating a state where some elements of the optical path adjusting device 10 of FIG. 2 are assembled. FIG. 4 is a perspective view illustrating a state where the optical path adjusting device 10 of FIG. 2 is assembled.

Referring to FIGS. 2 through 4, the optical path adjusting device 10 includes a rotating unit 20 that rotates and includes a first through-hole 21 through which light passes, a moving unit 30 that is movably disposed relative to the rotating unit 20 and opens or closes the first through-hole 21, a transmitting unit 40 that transmits a rotational force of the rotating unit 20 to the moving unit 30, and an optical unit 50 that is disposed on the moving unit 30 and blocks at least part of light passing through the first through-hole 21.

The rotating unit 20 includes the first through-hole 21 through which light passes, and is disposed to rotate about the first through-hole 21. The first through-hole 21 acts as a light path through which light passing through the lenses 112 of FIG. 1 is guided to the imaging device 120. The rotating unit 20 has an annular shape, and includes a gear surface 22 that extends from an outer circumferential surface in a circumferential direction.

The moving unit 30 is movably disposed relative to the rotating unit 20. The moving unit 30 supports the optical unit 50 and may move away from the first through-hole 21 to a retreat position where the first through-hole 21 is opened. Also, the moving unit 30 may move toward the first through-hole 21 to an advance position where the first through-hole 21 is closed. The moving unit 30 is disposed to linearly move between the advance position and the retreat position.

The transmitting unit 40 is disposed between the rotating unit 20 and the moving unit 30. The transmitting unit 40 is coupled to the rotating unit 20 and the moving unit 30, and rotates the moving unit 30 by transmitting a rotational force of the rotating unit 20 to the moving unit 30.

The moving unit 30 includes a first slider 31 and a second slider 32 that may move toward each other or away from each other. The advance position of the moving unit 30 is a position where the first through-hole 21 is closed as the first slider 31 and the second slider 32 move toward the first through-hole 21 to contact each other. Also, the retreat position of the moving unit 30 is a position where the first through-hole 21 is opened as the first slider 31 and the second slider 32 move away from the first through-hole 21.

A first magnetic portion 91 is disposed on the first slider 31, and a second magnetic portion 92 corresponding to the first magnetic portion 91 is disposed on the second slider 32. The first magnetic portion 91 and the second magnetic portion 92 generate an attractive force by which the first slider 31 and the second slider 32 attract each other.

The optical path adjusting device 10 may include a sensing unit (not shown) for detecting positions of the first slider 31 and the second slider 32. The sensing unit may be a hall sensor that detects the first magnetic portion 91 and the second magnetic portion 92, or a contact switch that operates when the first slider 31 or the second slider 32 contacts the sensing unit.

The optical path adjusting device 10 includes a support unit 60 that supports the first slider 31 and the second slider 32 such that the first slider 31 and the second slider 32 may linearly move. The support unit 60 includes linear grooves 60a and 60b that respectively guide linear motions of the first slider 31 and the second slider 32. The first slider 31 and the second slider 32 may be respectively coupled to the linear grooves 60a and 60b, to linearly slide in the linear grooves 60a and 60b.

Optical unit 50 includes a first liquid crystal device 51 and a second liquid crystal device 52 that are respectively disposed on the first slider 31 and the second slider 32. The first liquid crystal device 51 and the second liquid crystal device 52 pass light therethrough or block light by receiving an external signal through signal supply plates 56 and 57. The first and second liquid crystal devices 51 and 52 use a phenomenon in which a refractive index of a liquid crystal material varies according to orientations of liquid crystal molecules, which are changed when an electric field is applied to the liquid crystal material. The first liquid crystal device 51 and the second liquid crystal device 52 may receive a control signal from the optical path controller 145 of FIG. 1 and operate to pass or block light.

Although the optical unit 50 includes the liquid crystal devices 51 and 52, the present embodiment is not limited thereto. For example, the optical unit 50 may include a polarizing filter that passes light of wavelengths having different phases. That is, the optical unit 50 may include a first filter that passes only a P-polarized component therethrough and a second filter that passes only an S-polarized component therethrough from light passing through the optical unit 50, to block at least part of the light passing through the first through-hole 21 of the rotating unit 20. In this case, a 3D image may be captured by disposing a light-dividing filter that may selectively pass only a P-polarized component or an S-polarized component therethrough in front of the imaging device 120 of FIG. 1.

Optical path forming members 58 and 59 are respectively attached to the first liquid crystal device 52 and the second liquid crystal device 51. The optical path forming members 58 and 59 respectively include through-holes 58a and 59a that define paths through which light passes.

The first slider 31 and the second slider 32 respectively include a first linear gear 31b and a second linear gear 31a that extend in a direction in which the first slider 31 and the second slider 32 linearly move. Also, the first slider 31 and the second slider 32 respectively include a second through-hole 31b and a third through-hole 32b through which light passes.

The support unit 60 may include stoppers 65a and 65b that limit motions of the first slider 31 and the second slider 32 away from each other. Also, the support unit 60 includes a fourth through-hole 61 corresponding to the first through-hole 21.

The support unit 60 surrounds and supports not only the moving unit 30 but also other elements, such as the rotating unit 20 and the transmitting unit 40. The support unit 60 rotatably supports the rotating unit 20.

A first transmission gear 41 and a second transmission gear 42 of the transmitting unit 40 are respectively rotatably coupled to support shafts 41a and 42a that are coupled to the support unit 60.

A driving unit 70 for generating a driving force is provided on the support unit 60. The driving unit 70 includes a driving motor 71, and a driving gear 72 that is coupled to a shaft 71a of the driving motor 71. An intermediate gear 80 is disposed between the driving unit 70 and the rotating unit 20. The intermediate gear 80 is rotatably coupled to a rotational shaft 80a, and includes a first gear 81 engaged with the driving gear 72 and a second gear 82 engaged with the gear surface 22.

The driving motor 71 may be embodied as any of various motors such as a step motor, a voice coil motor, and an ultrasonic motor using a piezoelectric element.

The first transmission gear 41, the second transmission gear 42, and the intermediate gear 80 are stably coupled to the support unit 60 with coupling plates 42c and 80c and coupling members 42d and 80d.

When the driving gear 72 is rotated by the driving motor 71, a driving force of the driving motor 71 may be transmitted to the gear surface 22 of the rotating unit 20 through the intermediate gear 80 so that the rotating unit 20 may rotate about the first through-hole 21.

When elements such as the moving unit 30 and the transmitting unit 40 are mounted on the support unit 60, a cover 69 is coupled to one surface of the support unit 60. The cover 69 includes a fifth through-hole 69a corresponding to the fourth through-hole 61 and the first through-hole 21. The cover 69 is coupled to the support unit 60 with a coupling member 68 that passes through a coupling hole 69d.

In the optical path adjusting device 10 constructed as described above, since the moving unit 30 and the optical unit 50 move by receiving a rotational force of the rotating unit 20, the optical unit 50 may conveniently move to the advance position for a 3D photographing mode or the retreat position for the 2D photographing mode by using a compact structure.

Figure 5:
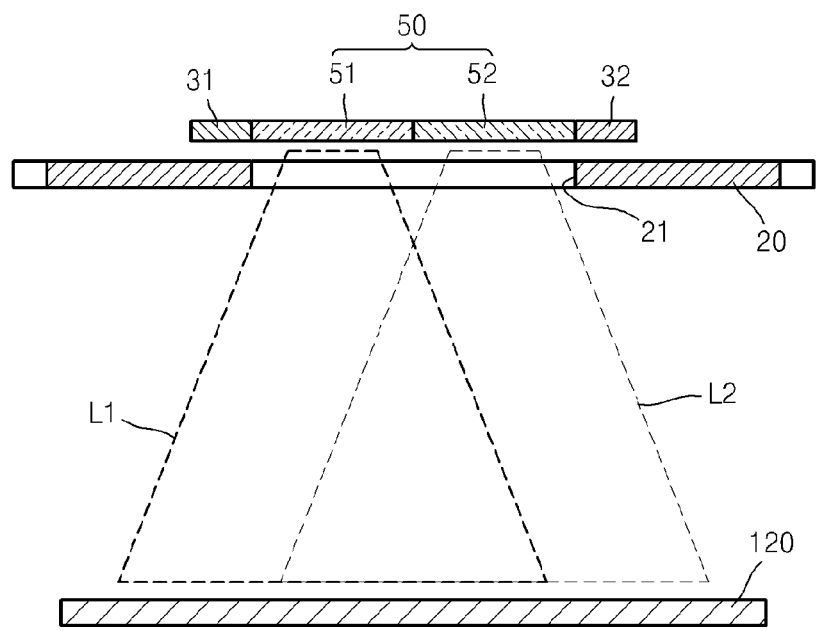
FIG. 5 is a pictorial view for explaining an operation of capturing a three-dimensional (3D) image by using the optical path adjusting device of FIG. 2.

FIG. 5 is a conceptual pictorial view for explaining an operation of capturing a 3D image by using the optical path adjusting device 10 of FIG. 2.

Light passing through the first liquid crystal device 51 is denoted by L, and light passing through the second liquid crystal device 52 is denoted by R. FIG. 5 shows a 3D photographing mode for capturing a 3D image by using the imaging device 120.

In order to capture a 3D image, the first liquid crystal device 51 and the second liquid crystal device 52 are driven at different times to alternately pass light therethrough. Since the imaging device 120 is driven in connection with operations of the first liquid crystal device 51 and the second liquid crystal device 52 to alternately pass light, a first image captured from left light L1 passing through the first liquid crystal device 51 and a second image captured from right light L2 passing through the second liquid crystal device 52 may be obtained.

In such a 3D photographing mode, any one of the first liquid crystal device 51 and the second liquid crystal device 52 operates to block light. That is, when the optical unit 50 is located at the advance position to capture a 3D image, the optical unit 50 blocks at least part of the light passing therethrough.

Figure 6:
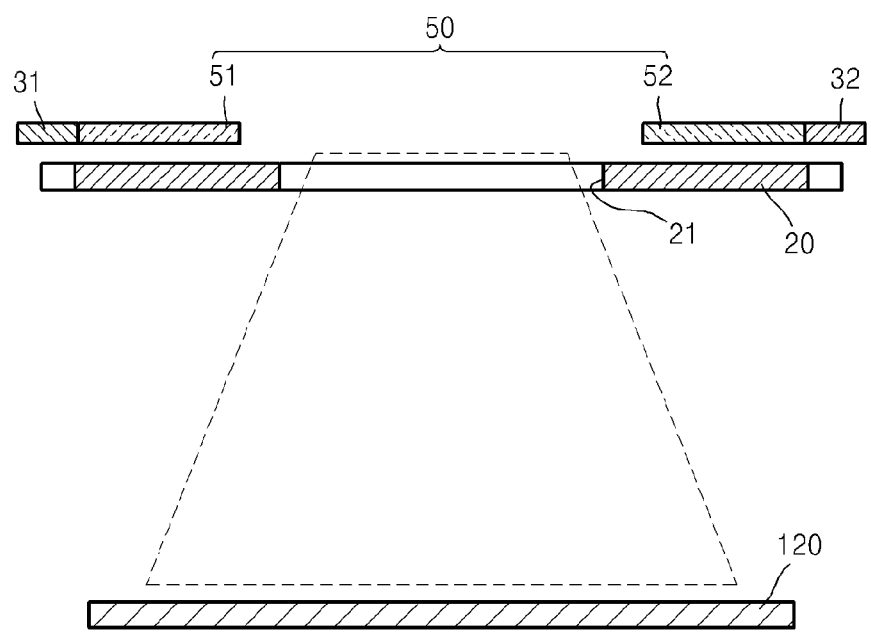
FIG. 6 is a pictorial view for explaining an operation of capturing a two-dimensional (2D) image by using the optical path adjusting device of FIG. 2.

FIG. 6 is a conceptual pictorial view for explaining an operation of capturing a 2D image by using the optical path adjusting device 10 of FIG. 2.

Referring to FIG. 6, the optical unit 50 is located at the retreat position after moving away from the first through-hole 21. In such a state, the imaging device 120 obtains, in a 2D photographing mode, one image by using light introduced through the first through-hole 21.

In general, in order to capture a 3D image, an optical element for splitting an optical path needs to be located on the optical path. However, when a 2D image is to be captured by using a photographing apparatus for capturing a 3D image, an optical element located on an optical path reduces an amount of light introduced to an imaging device 120. Accordingly, a 2D image captured in a 2D photographing mode may suffer from lack of exposure.

However, when the photographing apparatus including the optical path adjusting device 10 is used, since the optical unit 50 may move between the advance position and the retreat position, a sufficient amount of light may be secured in a 2D photographing mode as shown in FIG. 6.

Figure 7:
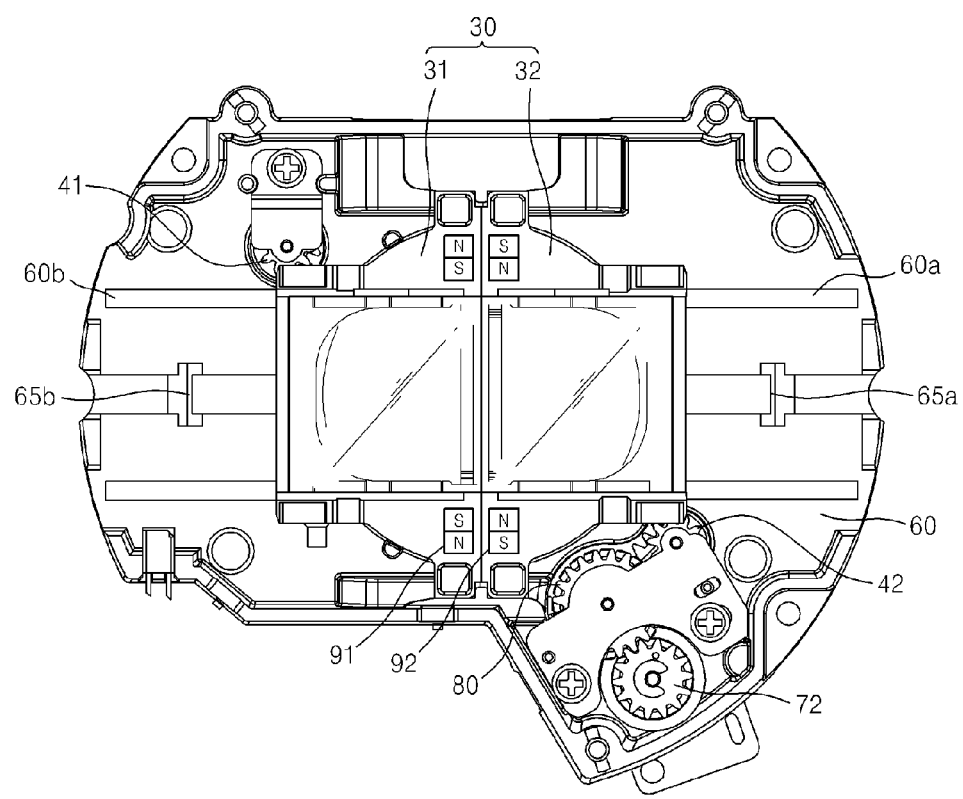
FIG. 7 is a plan view illustrating a state where a through-hole is closed in the optical path adjusting device of FIG. 2.

FIG. 7 is a plan view illustrating a state where the first through-hole 21 is closed in the optical path adjusting device 10 of FIG. 2.

Referring to FIG. 7, the first magnetic portion 91 is disposed on the first slider 31 and the second magnetic portion 92 corresponding to the first magnetic portion 91 is disposed on the second slider 32. Poles of the first magnetic portion 91 and the second magnetic portion 92 are arranged to attract each other. That is, the poles of the first magnetic portion 91 and the second magnetic portion 92 are arranged in a direction perpendicular to a direction in which the first slider 31 and the second slider 32 slide, and the N-pole of the first magnetic portion 91 faces the S-pole of the second magnetic portion 92 and the S-pole of the first magnetic portion 91 faces the N-pole of the second magnetic portion 92.

Since the first magnetic portion 91 and the second magnetic portion 92 are arranged in this manner, when the first slider 31 and the second slider 32 are at the advance position, the first magnetic portion 91 and the second magnetic portion 92 may apply an attractive force by which the first slider 31 and the second slider 32 approach each other.

Figure 8:
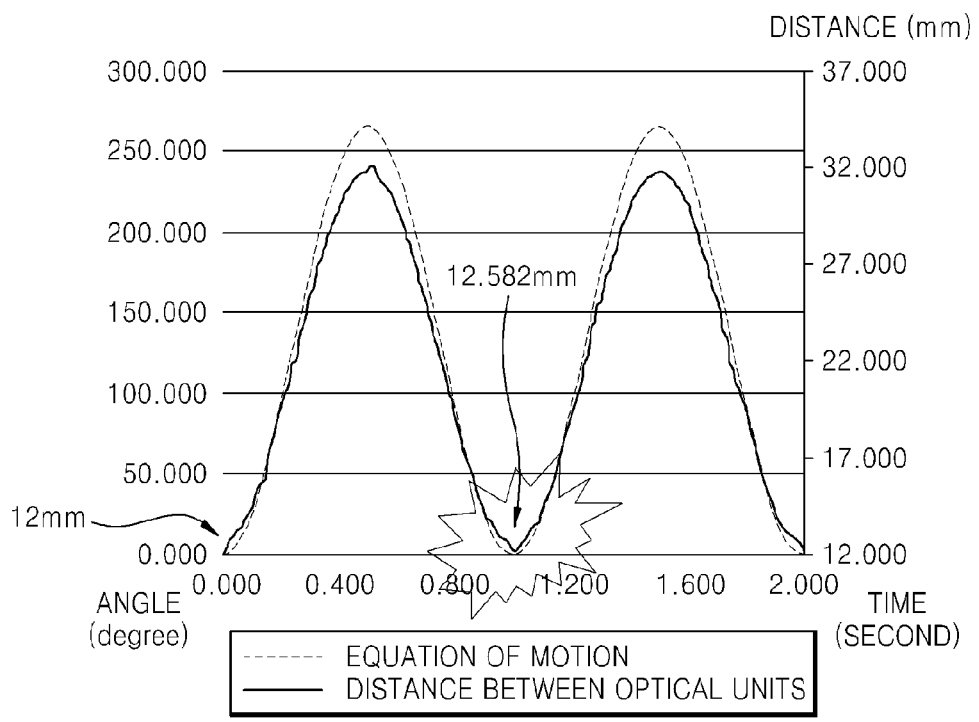
FIG. 8 is a graph for explaining a modified example where a first magnetic portion and a second magnetic portion are removed from the optical path adjusting device of FIG. 7.

FIG. 8 is a graph for explaining a modified example where the first magnetic portion 91 and the second magnetic portion 92 are removed from the optical path adjusting device 10 of FIG. 7.

Referring to FIG. 8, when the optical adjusting device 10 operates after the first magnetic portion 91 and the second magnetic portion 92 are separated from the first slider 31 and the second slider 32, an interval between centers of the first slider 31 and the second slider 32 varies according to an angle at which the rotating unit 20 of FIG. 2 rotates as time elapses.

In FIG. 8, a curve marked by a dashed line indicates a state when the optical path adjusting device 10 including the first slider 31 and the second slider 32 ideally operates, and corresponds to an ideal equation of motion of the optical path adjusting device 10.

Also, in FIG. 8, a curve marked by a solid line indicates a state when the optical path adjusting device 10 operates with the first magnetic portion 91 and the second magnetic portion 92 removed from the first slider 31 and the second slider 32. While an interval between centers of the first slider 31 and the second slider 32 at their initial stages before the rotating unit 20 of FIG. 2 rotates is 12 mm, the interval between centers of the first slider 31 and the second slider 32 about 1 second after the rotating unit 20 rotates is about 12.6 mm.

The reason why there is a difference in an interval between the first slider 31 and the second slider 32 is that there is a mechanical backlash between elements of the optical path adjusting device 10.

In order to compensate for the difference, an additional element for generating a pressure for pulling the first slider 31 and the second slider 32 to each other is required. However, when an elastic member such as a spring is used for this purpose, since a pressure generated by the elastic member increases as an interval between the first slider 31 and the second slider 32 increases, a motor for generating a strong driving force is required. Also, when the first slider 31 and the second slider 32 move to the advance position to get closer to each other, loud driving noise is generated when the first slider 31 and the second slider 32 collide with each other due to the pressure of the elastic member.

Figure 9:
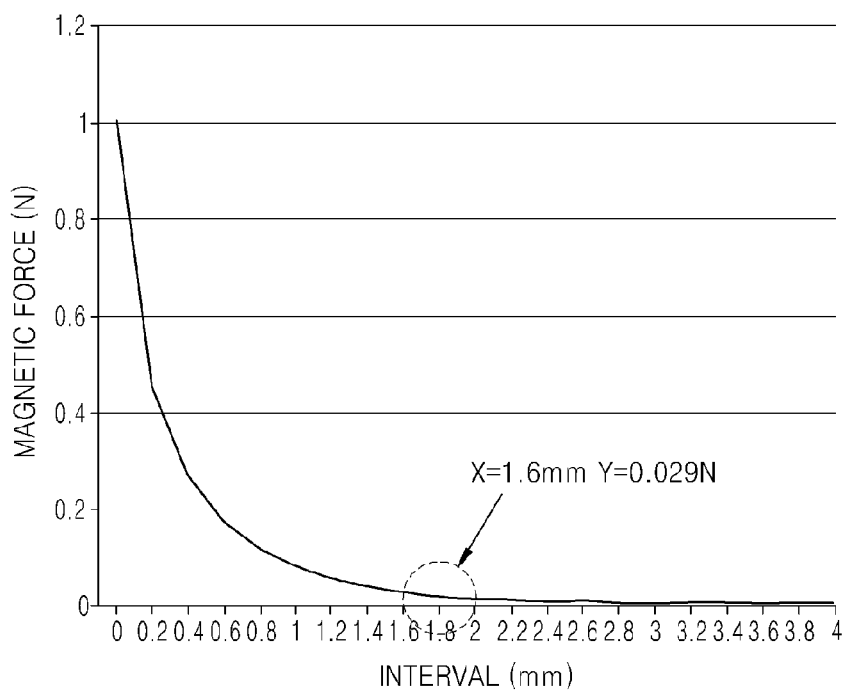
FIG. 9 is a graph illustrating a relationship between a magnetic force and a distance between the first magnetic portion and the second magnetic portion in the optical path adjusting device of FIG. 7.

FIG. 9 is a graph illustrating a relationship between a magnetic force and a distance between the first magnetic portion 91 and the second magnetic portion 92 in the optical path adjusting device 10 of FIG. 7.

Referring to FIG. 9, when an interval between the first magnetic portion 91 and the second magnetic portion 92 of FIG. 7 is reduced to be less than a critical point (when X=about 1.6 mm), a magnetic force is drastically increased. In contrast, when the interval between the first magnetic portion 91 and the second magnetic portion 92 is increased to be greater than the critical point, the magnetic force is greatly reduced.

As such, by using the first magnetic portion 91 and the second magnetic portion 92, which apply magnetic forces to each other, instead of an elastic member, the first slider 31 and the second slider 32 of FIG. 2 may be closely attached to each other at the advance position, a driving force needed to drive the first slider 31 and the second slider 32 and driving noise may be reduced, and a size of the driving unit 70 may be reduced, thereby making it possible to design the optical path adjusting device 10 having a compact structure.

Although the first magnetic portion 91 and the second magnetic portion 92 may be permanent magnets, the present embodiment is not limited thereto. Accordingly, any one of the first magnetic portion 91 and the second magnetic portion 92 may be a permanent magnet, and the other may be a magnetic body (e.g., a yoke) to which a magnetic force is applied.

Figure 10:
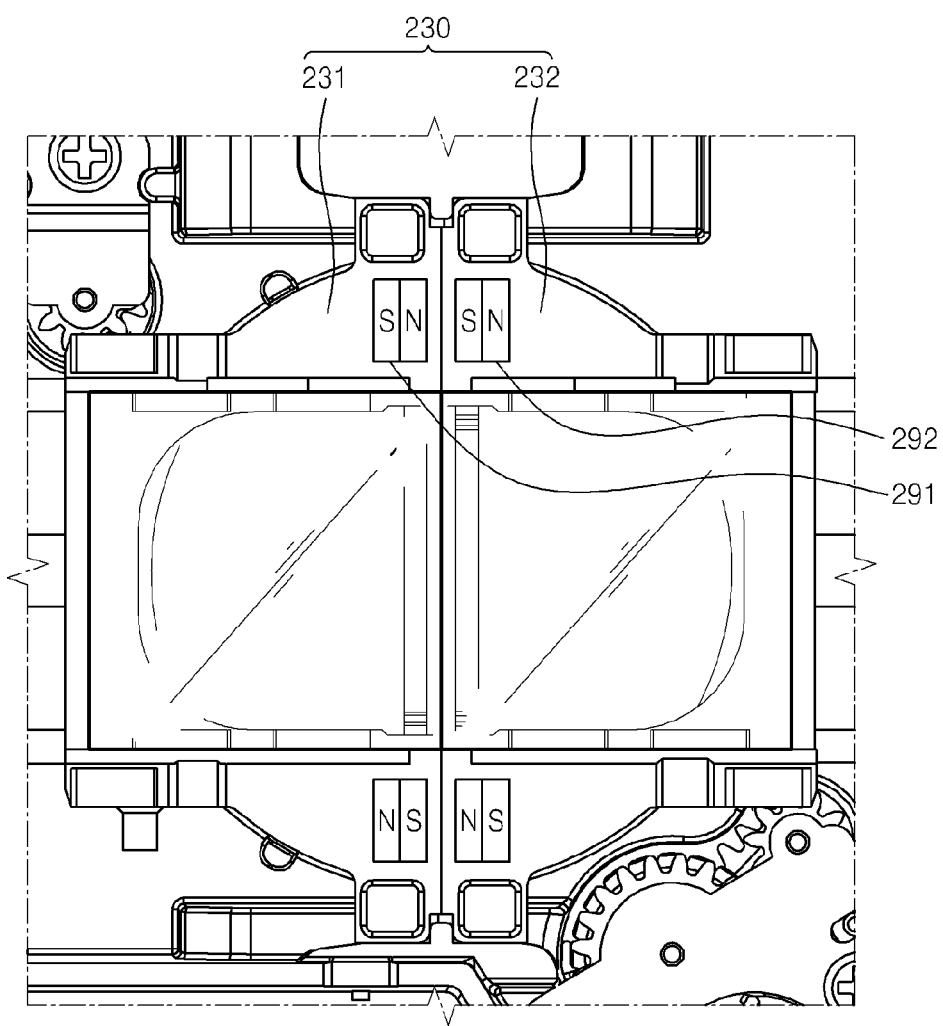
FIG. 10 is a plan view illustrating another modified example where the first magnetic portion and the second magnetic portion of the optical path adjusting device are arranged differently from as disposed in FIG. 7.

FIG. 10 is a plan view illustrating another modified example where the first magnetic portion 91 and the second magnetic portion 92 of the optical path adjusting device 10 are disposed differently from as disposed in FIG. 7.

Referring to FIG. 10, poles of a first magnetic portion 291 and a second magnetic portion 292 respectively disposed on a first slider 231 and a second slider 232 are disposed differently from how the poles of the first magnetic portion 91 and the second magnetic portion 92 are disposed. That is, the poles of the first magnetic portion 291 and the second magnetic portion 292 are arranged in a direction in which the first slider 231 and the second slider 232 slide, and facing poles of the first magnetic portion 291 and the second magnetic portion 292 are opposite of each other.

Any one of the first magnetic portion 291 and the second magnetic portion 292 may be a permanent magnet and the other may be a magnetic body (e.g., a yoke) to which a magnetic force is applied.

Figure 11:
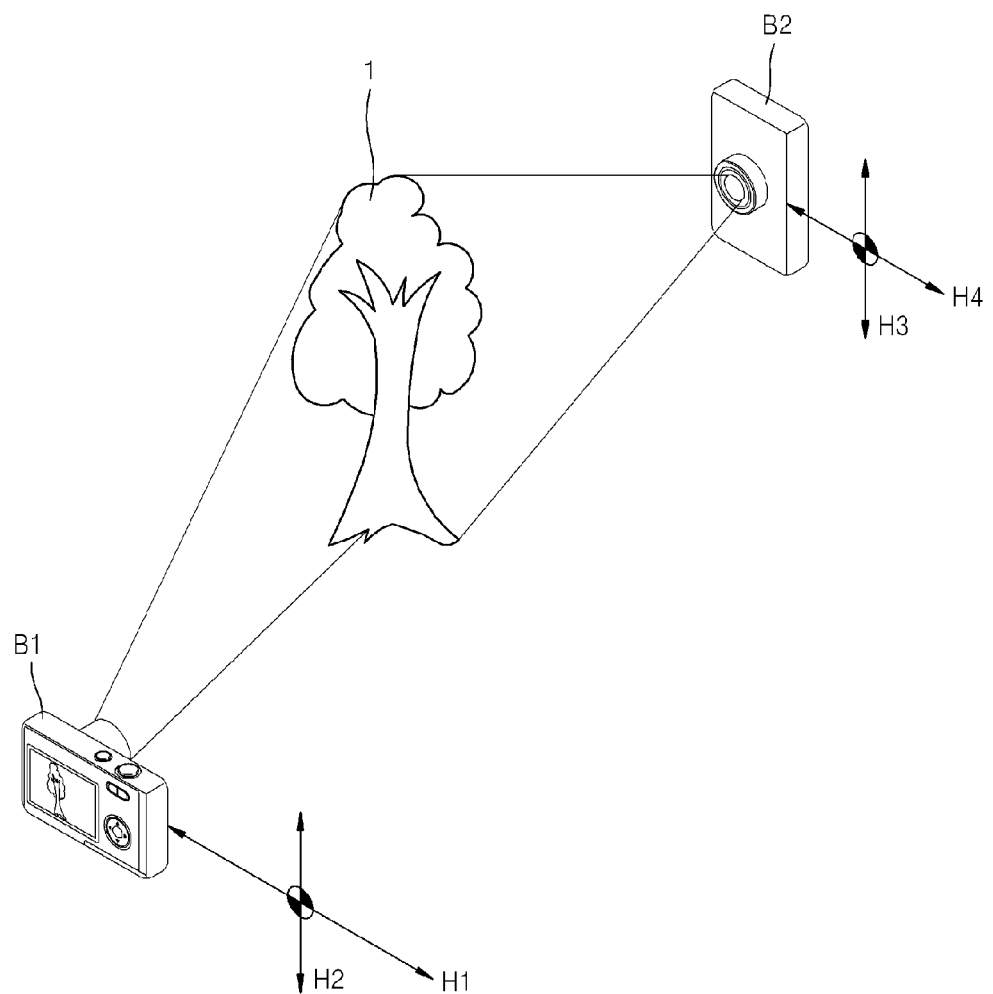
FIG. 11 is a pictorial view for explaining a photographing operation of the photographing apparatus of FIG. 1.

FIG. 11 is a conceptual pictorial view for explaining a photographing operation of the photographing apparatus of FIG. 1.

Referring to FIG. 1, the rotation sensing unit 160 may detect a rotational orientation of the photographing apparatus. A 3D photographing mode may be performed as shown in FIG. 11 in accordance with the rotational orientation of the photographing apparatus detected by the rotation sensing unit 160.

In FIG. 11, when a 3D photographing mode is performed by using a photographing apparatus B1 that is oriented in a horizontal direction H1 perpendicular to a gravity direction H2 in order to photograph a subject 1, e.g., a tree, (a first photographing operation), a 3D image may be captured by obtaining a first image and a second image as left and right images.

Figure 12:
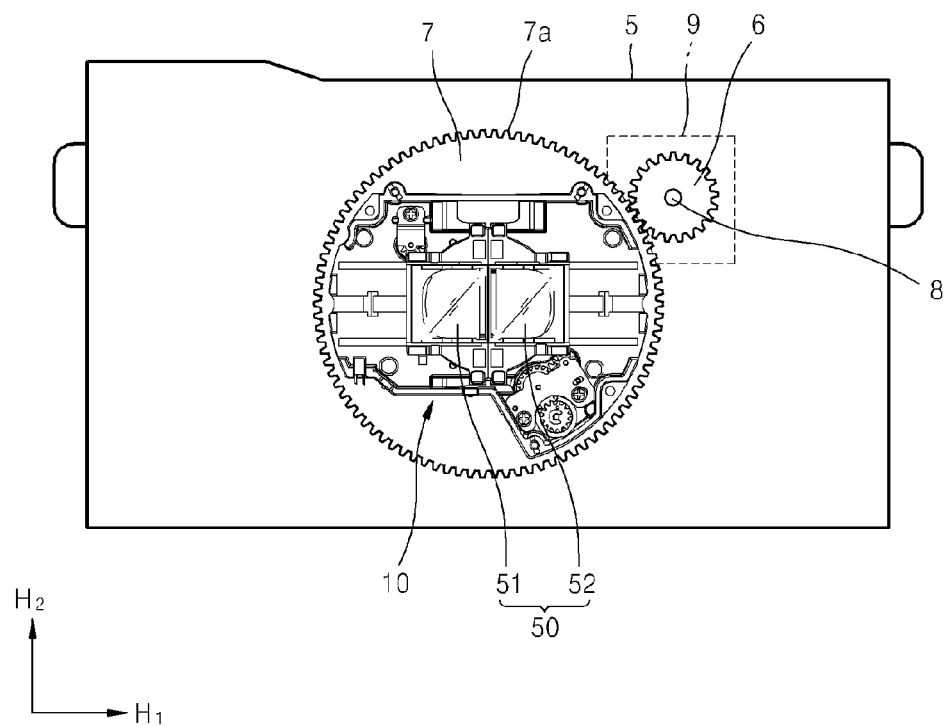
FIG. 12 is a pictorial cutaway view for explaining an operation of the optical path adjusting device when a first photographing operation is performed in FIG. 11.

FIG. 12 is a conceptual cutaway view for explaining an operation of the optical path adjusting device 10 when the first photographing operation is performed in FIG. 11.

The optical path adjusting device 10 is mounted on a rotating stage 7 that is rotatably disposed on a main body 5 of the photographing apparatus. The rotating stage 7 includes a gear surface 7a on an outer circumferential surface. An adjustment gear 6 that rotates about a rotational shaft 8 is provided on the main body 5. The adjustment gear 6 may be operated by the angle adjusting unit 9 provided on the main body 5.

Since the adjustment gear 6 rotates while being coupled to the gear surface 7a of the rotating stage 7, the optical path adjusting device 10 may rotate relative to the main body 5 of the photographing apparatus along with the rotating stage 7 as the adjustment gear 6 rotates.

In FIG. 12, during the first photographing operation, the first liquid crystal device 51 and the second liquid crystal device 52 of the optical unit 50 of the optical path adjusting device 10, which are disposed in a horizontal direction $H_1$ of the main body 5 of the photographing apparatus, may slide in the horizontal direction $H_1$.

Since first and right images obtained to have parallax in the horizontal direction $H_1$ by performing photographing when the photographing apparatus B1 is maintained in the first horizontal direction $H_1$ have different angles in the first horizontal direction $H_1$, a natural 3D image for two eyes of a person may be formed.

Referring back to FIG. 11, when a 3D photographing mode is performed by using a photographing apparatus B2 that is rotated to be posed in a direction parallel to a gravity direction $H_3$ in order to photograph the subject 1, a first image and a second image need to be obtained to have parallax in a horizontal direction $H_4$ perpendicular to the gravity direction $H_3$.

However, when a 3D photographing mode is performed by using the photographing apparatus B2 rotated to be parallel to the gravity direction $H_3$, if a first image and a second image having different angles in the gravity direction $H_3$ are obtained without considering a rotational orientation of the photographing apparatus B2, the first image and the second image have different angles in a vertical direction of an observer. Accordingly, a 3D image obtained by using the first image and the second image may not be seen as a 3D image by the observer and may be seen as an unfocused image.

Figure 13:
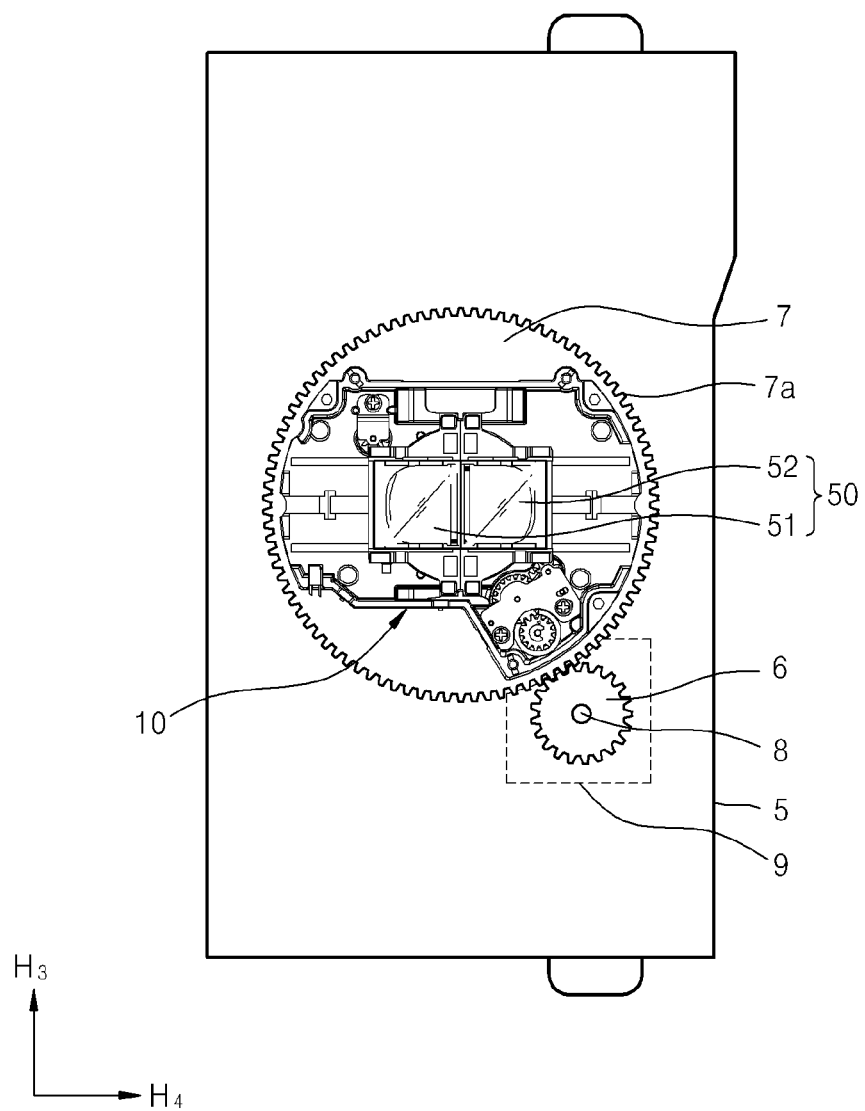
FIG. 13 is a pictorial cutaway view for explaining an operation of the optical path adjusting device when a second photographing operation is performed in FIG. 11.

FIG. 13 is a conceptual cutaway view for explaining an operation of the optical path adjusting device 10 when a second photographing operation is performed in FIG. 11.

When a 3D photographing mode is performed by using the photographing apparatus B2 rotated to be parallel to the gravity direction $H_3$ as shown in FIG. 11 (the second photographing operation), the optical path adjusting device 10 may rotate relative to the main body 5, and the first liquid crystal device 51 and the second liquid crystal device 52 of the optical unit 50 may be disposed in a horizontal direction $H_4$ and may slide in the horizontal direction $H_4$.

When a 3D photographing mode is performed in this state, a first image and a second image having parallax in the horizontal direction $H_4$ perpendicular to the gravity direction $H_3$ may be obtained. Since a 3D image obtained by using the first image and the second image has different angles in a horizontal direction, a natural 3D image for two eyes of a person may be formed.

Figure 14:
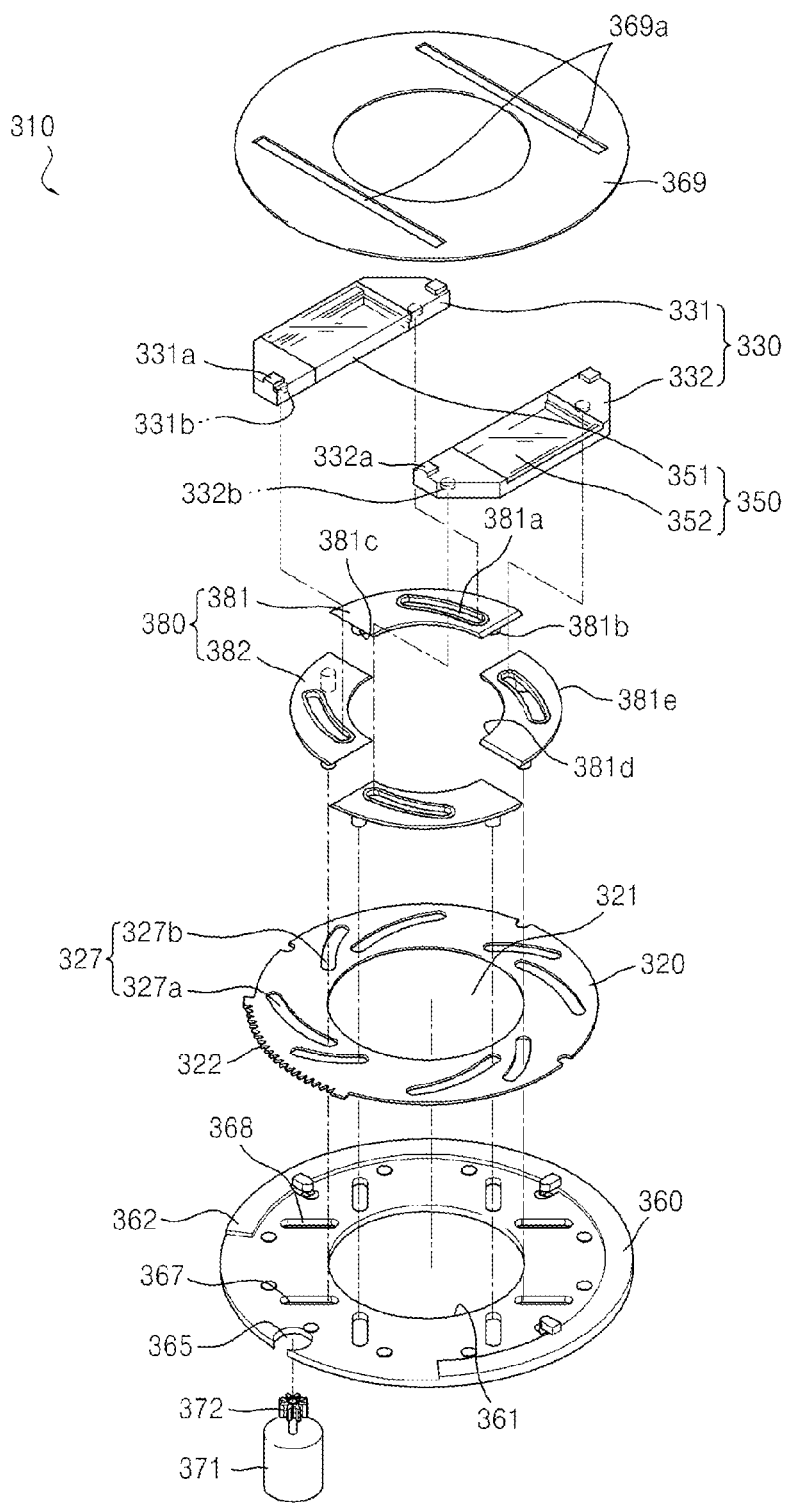
FIG. 14 is an exploded perspective view illustrating elements of an optical path adjusting device according to another embodiment of the invention.

FIG. 14 is an exploded perspective view illustrating elements of an optical path adjusting device 310 according to another embodiment of the invention.

Referring to FIG. 14, the optical path adjusting device 310 includes a rotating unit 320 that rotates and includes a first through-hole 321 through which light passes, a moving unit 330 that is movably disposed relative to the rotating unit 320 and opens or closes the first through-hole 321, a transmitting unit 380 that transmits a rotational force of the rotating unit 320 to the moving unit 330, and a plurality of optical units 350 that are disposed on the moving unit 330 and block at least part of light passing through the first through-hole 321.

The rotating unit 320 includes the first through-hole 321 through which light passes, and is disposed to rotate about the first through-hole 321. Also, the rotating unit 320 includes a plurality of long hole pairs 327. Each of the long hole pairs 327 includes a first long hole 327a and a second long hole 327b that extend outward in curves. The first long hole 327a and the second long hole 327b are formed outside the first through-hole 321 of the rotating unit 320.

The moving unit 330 is movably disposed relative to the rotating unit 320. The moving unit 330 supports the optical units 350 and may move away from the first through-hole 321 to a retreat position where the first through-hole 321 is opened. Also, the moving unit 330 may move toward the first through-hole 321 to an advance position where the first through-hole 321 is closed. The moving unit 330 is disposed to linearly move between the advance position and the retreat position.

The moving unit 330 includes a first slider 331 and a second slider 332 that may move toward each other or away from each other. The first slider 331 and the second slider 332 respectively include sliding protrusions 331a and 332a. The sliding protrusions 331a and 332a are inserted into a linear guide 369a of a support unit 369 disposed outside the moving unit 330. Accordingly, the first slider 331 and the second slider 332 may linearly move in a direction in which the linear guide 369a extends.

The optical units 350 block at least part of light and are disposed on the moving unit 330. The optical units 350 include a first liquid crystal device 351 and a second liquid crystal device 352 that are respectively disposed on the first slider 331 and the second slider 332. The first liquid crystal device 351 and the second liquid crystal device 352 operate by receiving an external signal and pass or block light.

The transmitting unit 380 is disposed between the rotating unit 320 and the moving unit 330. The transmitting unit 380 includes a plurality of transmission plates 381 and 382. The transmission plates 381 and 382 are coupled to the rotating unit 320 and the moving unit 330, and rotate the moving unit 330 by transmitting a rotational force of the rotating unit 320 to the moving unit 330.

The transmission plates 381 and 382 include a first sliding protrusion 381c and a second sliding protrusion 381b respectively coupled to the first long hole 327a and the second long hole 327b, and a third long hole 381a extending in curves with respect to the first long hole 327a and the second long hole 327b. As the rotating unit 320 rotates, the first sliding protrusion 381c and the second sliding protrusion 381b are guided by the first long hole 327a and the second long hole 327b. Accordingly, the transmission plates 381 and 382 move inward or outward in a radial direction of the rotating unit 320 due to a rotational force of the rotating unit 320.

Each of the transmission plates 381 and 382 is manufactured to have an arc shape, and includes an inner circumferential surface 381d and an outer circumferential surface 381e. Although the number of the transmission plates 381 and 382 is 4 in FIG. 14, the present embodiment is not limited thereto and another number of transmission plates may be provided.

The first slider 331 and the second slider 332 respectively include third sliding protrusions 331b and 332b that are inserted into the third long hole 381a of each of the transmission plates 381 and 382.

The rotating unit 320 is rotatably mounted on a transmission plate guide unit 360. The transmission plate guide unit 360 includes a circular jaw portion 362 that rotatably supports the rotating unit 320. A second through-hole 361 corresponding to the first through-hole 321 of the rotating unit 320 is formed on a center of the transmission plate guide unit 360 outside the circular jaw portion 362.

A gear surface 322 extends in an outer circumferential direction of the rotating unit 320. A driving gear 372 that is rotated by a driving motor 371 mounted on the transmission plate guide unit 360 is coupled to the gear surface 322 of the rotating unit 320 through an outer hole 365 of the transmission plate guide unit 360. When the driving motor 371 rotates the driving gear 372, a driving force may be transmitted to the rotating unit 320 and the rotating unit 320 may rotate relative to the transmission plate guide unit 360.

The transmission plate guide unit 360 includes a fourth long hole 367 and a fifth long hole 368 that extend in a radial direction outside the second through-hole 361. The fourth long hole 367 and the fifth long hole 368 slidably support the first sliding protrusion 381c and the second sliding protrusion 381b respectively passing through the first long hole 327a and the second long hole 327b. The fourth long hole 367 and the fifth long hole 368 of the transmission plate guide unit 360 limit motions of the transmission plates 381 and 382 such that the transmission plates 381 and 382 may move in a radial direction.

Figure 15:
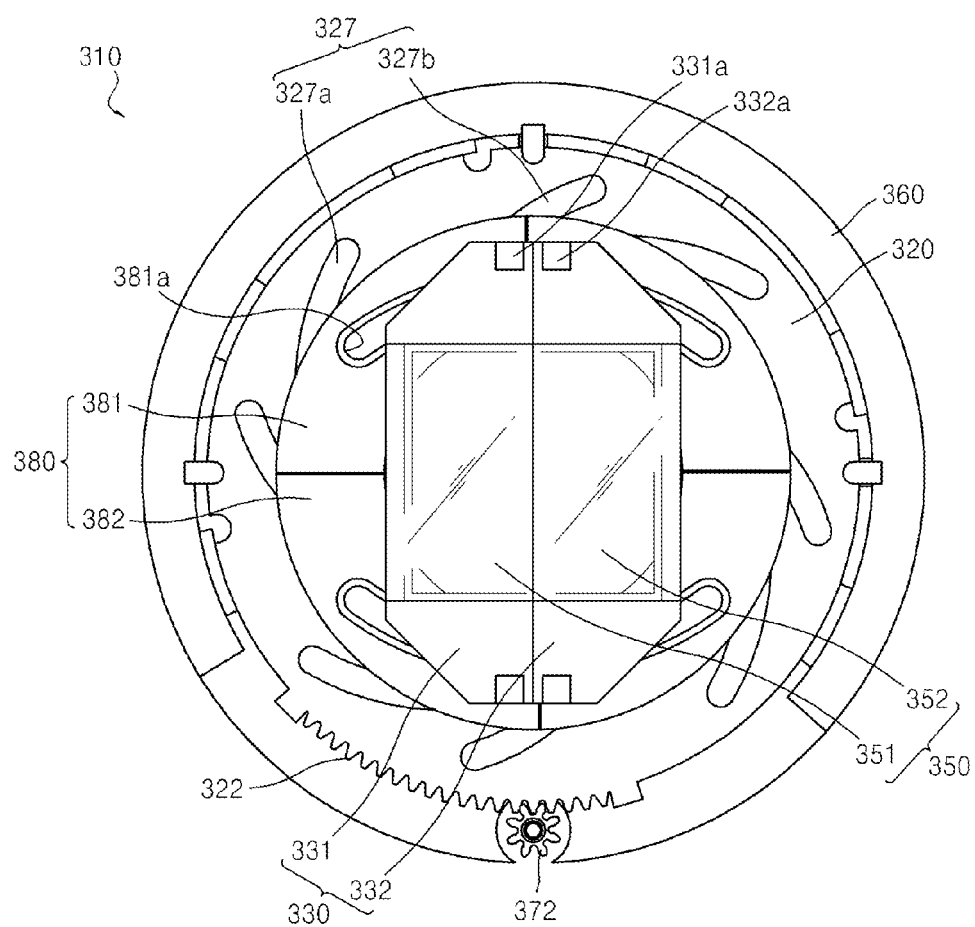
FIG. 15 is a plan view illustrating a state where a through-hole of the optical path adjusting device of FIG. 14 is closed.
Figure 16:
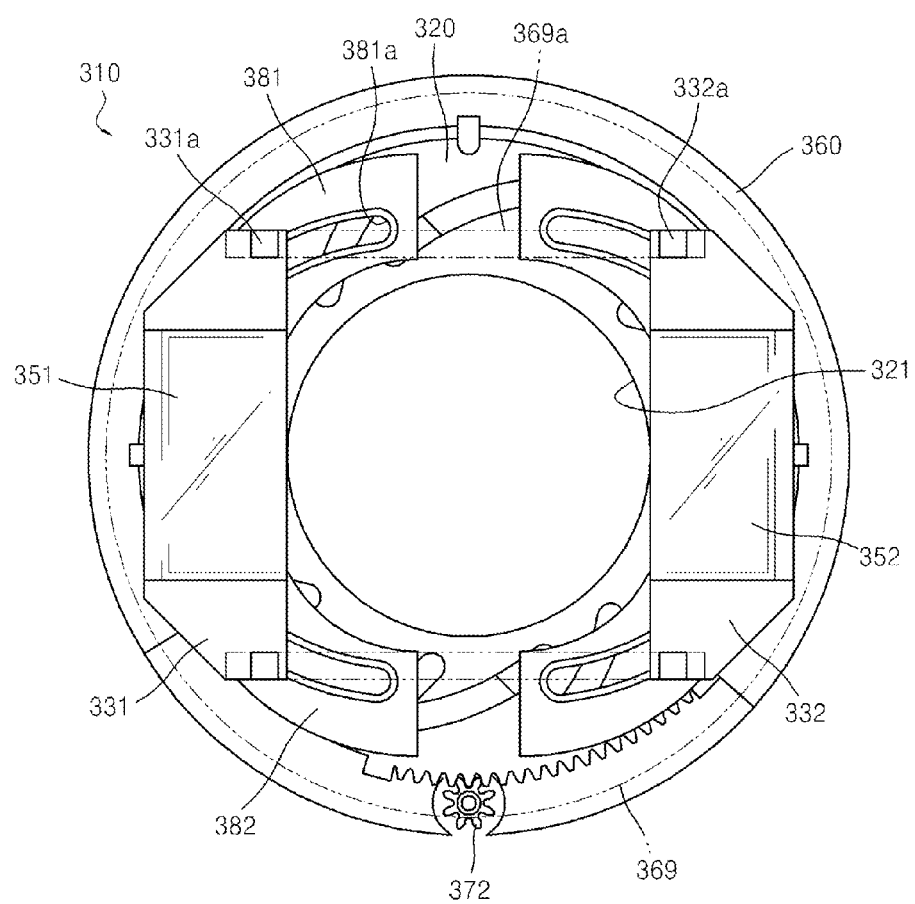
FIG. 16 is a plan view illustrating a state where the through-hole of the optical path adjusting device of FIG. 14 is opened.

FIG. 15 is a plan view illustrating a state where the first through-hole 321 of the optical path adjusting device 310 of FIG. 14 is closed. FIG. 16 is a plan view illustrating a state where the first through-hole 321 of the optical path adjusting device 310 of FIG. 14 is opened.

FIG. 15 illustrates a state where the first slider 331 and the second slider 332 move to the advance position corresponding to the first through-hole 321 of the rotating unit 320. FIG. 16 illustrates a state where the first slider 331 and the second slider 332 move to the retreat position outside the first through-hole 321.

In FIG. 15, when the driving gear 372 rotates, the rotating unit 320 rotates. As the rotating unit 320 rotates, a rotational force of the rotating unit 320 is transmitted to the first sliding protrusion 381c and the second sliding protrusion 381b through the long hole pairs 327 of the rotating unit 320.

Referring back to FIG. 14, since the first sliding protrusion 381c and the second sliding protrusion 381b of the transmission plates 381 and 382 are respectively coupled to the fourth long hole 367 and the fifth long hole 368 of the transmission plate guide unit 360, the transmission plates 381 and 382 move outward in a radial direction of the rotating unit 320.

As the transmission plates 381 and 382 move, forces of the transmission plates 381 and 382 are respectively transmitted to the sliding protrusions 331a and 332a of the first slider 331 and the second slider 332. Accordingly, the first slider 331 and the second slider 332 linearly move in a direction in which the linear guide 369a of the support unit 369 extends. As shown in FIG. 16, when both the first slider 331 and the second slider 332 move away from the first through-hole 321, the first through-hole 321 is completely opened.

Figure 17:
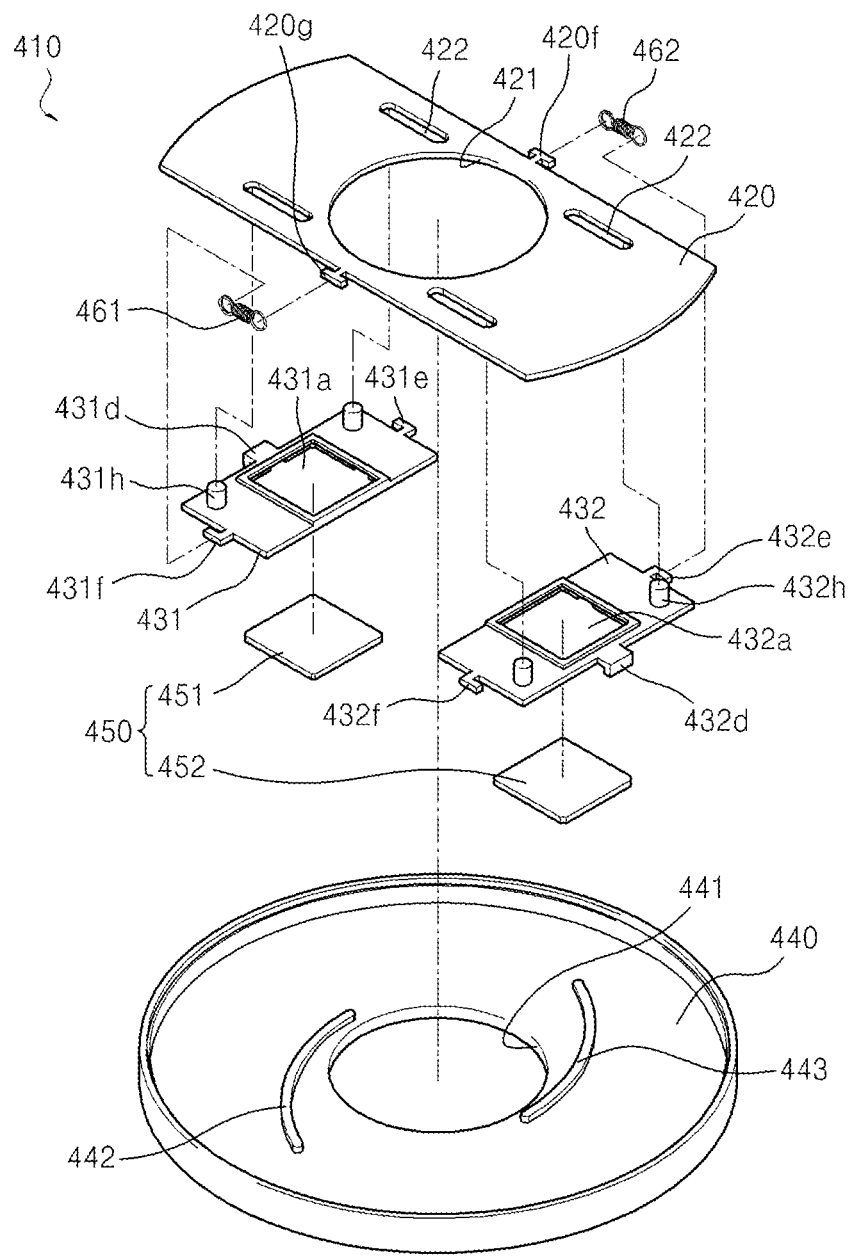
FIG. 17 is an exploded perspective view illustrating elements of an optical path adjusting device according to another embodiment of the invention.

FIG. 17 is an exploded perspective view illustrating elements of an optical path adjusting device 410 according to another embodiment of the invention.

Referring to FIG. 17, the optical path adjusting device 410 includes a rotating unit 420 that includes and rotates about a first through-hole 421 through which light passes, a first slider 431 and a second slider 432 that are linearly movably coupled to the rotating unit 420, a fixing unit 440 that rotatably supports the rotating unit 420 and includes guide portions 442 and 443 for guiding motions of the first slider 431 and the second slider 432, and a plurality of optical units 450 that are respectively disposed on the first slider 431 and the second slider 432 and block at least part of light passing through the first through-hole 421.

The fixing unit 440 surrounds and supports other elements. The fixing unit 440 includes a second through-hole 441 corresponding to the first through-hole 421 of the rotating unit 420. Also, the guide portions 442 and 443 of the fixing unit 440 guide the first slider 431 and the second slider 432 such that the first slider 431 and the second slider 432 may slide relative to the rotating unit 420.

The rotating unit 420 is rotatably disposed on the fixing unit 440. A driving unit (not shown) that generates a driving force so that the rotating unit 420 rotates relative to the fixing unit 440 may have the same structure as the driving units in the above embodiments, and thus is not shown.

A linear guide hole 422 is formed in the rotating unit 420. The first slider 431 and the second slider 432 respectively include sliding protrusions 431h and 432h inserted into the linear guide hole 422. Since the sliding protrusions 431h and 432h may slide in the linear guide hole 422, the first slider 431 and the second slider 432 may linearly slide in a direction in which the linear guide hole 422 of the rotating unit 420 extends.

The first slider 431 and the second slider 432 may respectively include through-holes 431a and 432a, and the optical units 450 are provided in the through-holes 431a and 432a. Each optical unit 450 includes a first liquid crystal device 451 disposed on the first slider 431 and a second liquid crystal device 452 disposed on the second slider 432. The first liquid crystal device 451 and the second liquid crystal device 452 operate by receiving an external signal and pass or block light.

The first slider 431 and the second slider 432 respectively include protrusions 431d and 432d that protrude toward the guide portions 442 and 443 of the fixing unit 440. While the rotating unit 420 rotates relative to the fixing unit 440, the protrusions 431d and 432d are guided by the guide portions 442 and 443.

The first slider 431 and the second slider 432 respectively include spring coupling portions 431e, 431f, 432e, and 432f that protrude outward. A first coil spring 461 and a second coil spring 462 are provided between the spring coupling portions 431e, 431f, 432e, and 432f and spring coupling portions 420f and 420g of the rotating unit 420. The first coil spring 461 and the second coil spring 462 apply to the first through-hole 420 an elastic force by which the first slider 431 and the second slider 432 attract each other.

Figure 18:
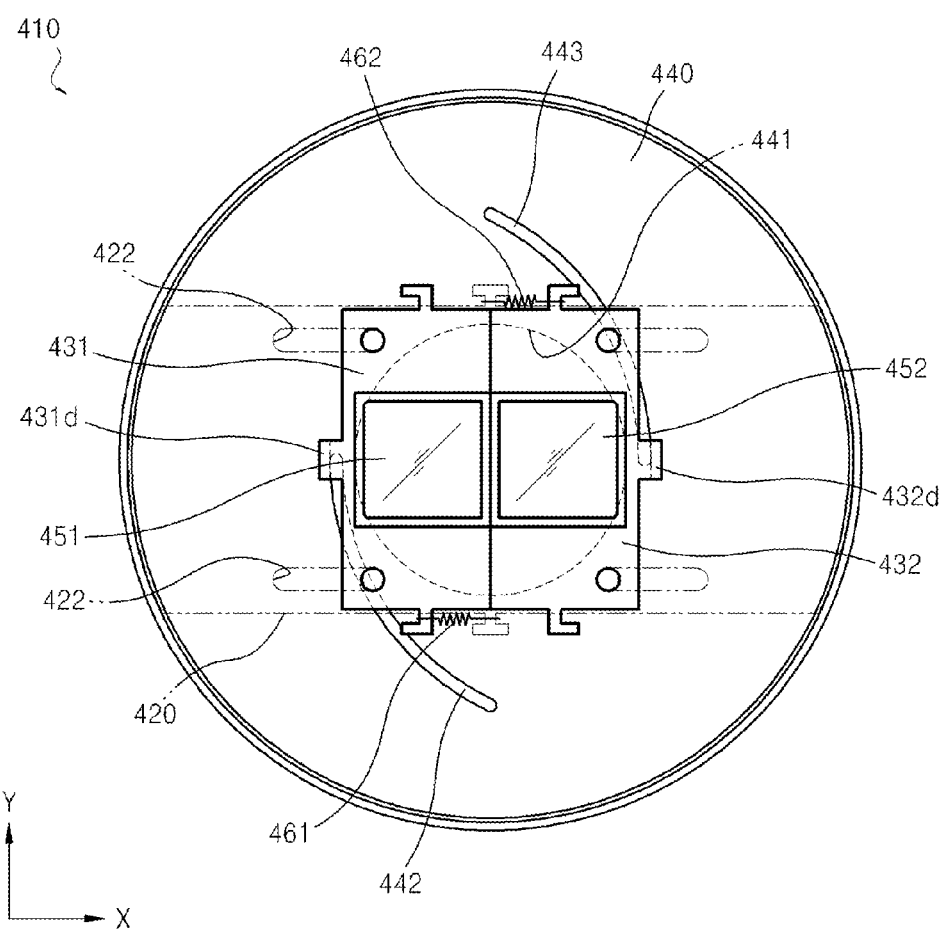
FIG. 18 is a plan view illustrating a state where a through-hole of the optical path adjusting device of FIG. 17 is closed.
Figure 19:
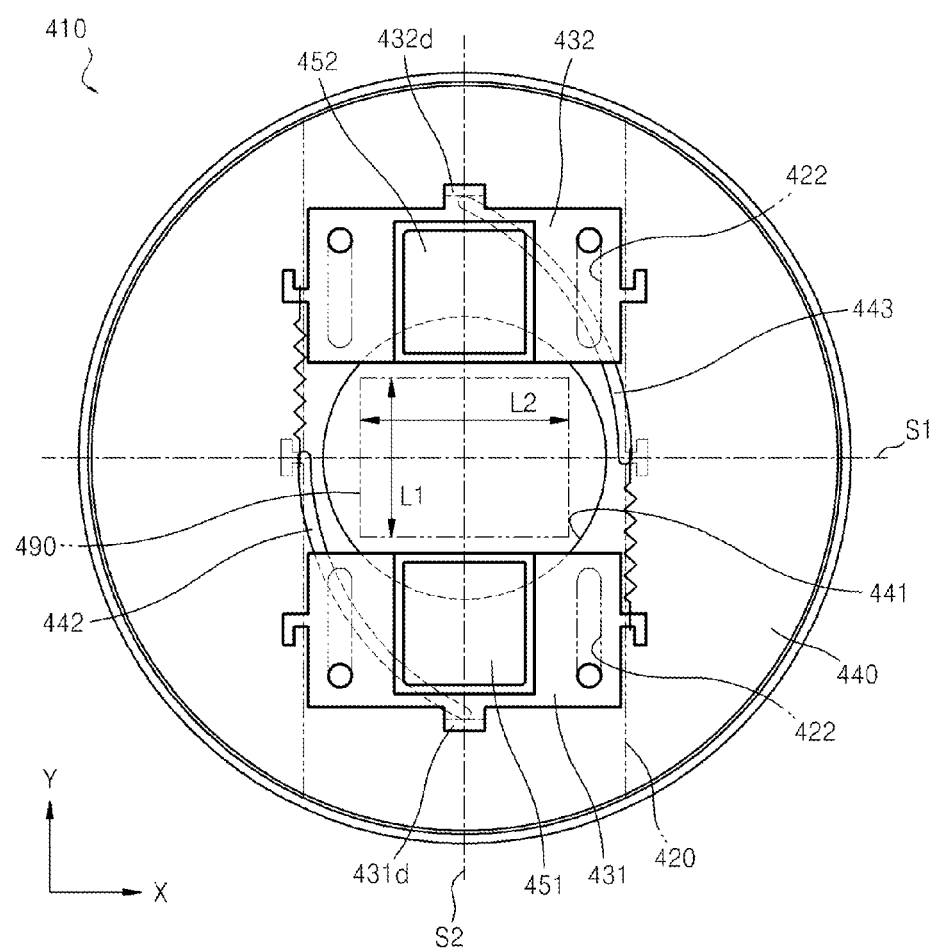
FIG. 19 is a plan view illustrating a state where the through-hole of the optical path adjusting device of FIG. 17 is opened.

FIG. 18 is a plan view illustrating a state where the first through-hole 421 of the optical path adjusting device 410 of FIG. 17 is closed. FIG. 19 is a plan view illustrating a state where the first through-hole 421 of the optical path adjusting device 410 of FIG. 17 is opened.

FIG. 18 illustrates a state where the first slider 431 and the second slider 432 are at an advance position corresponding to the first through-hole 421. FIG. 19 illustrates a case where the first slider 431 and the second slider 432 are at a retreat position outside the first through-hole 421.

As the rotating unit 420 rotates relative to the fixing unit 440, the guide portions 442 and 443 of the fixing unit 440 contact the protrusions 431d and 432d of the first slider 431 and the second slider 432 and guide motion paths of the first slider 431 and the second slider 432. Accordingly, as the rotating unit 420 rotates, the first slider 431 and the second slider 432 move in a radial direction about the first through-hole 421, and linearly slide relative to the rotating unit 420 in a direction in which the linear guide hole 422 of the rotating unit 420 extends.

When the first slider 431 and the second slider 432 are at the advance position where the first through-hole 421 is closed, the first slider 431 and the second slider 432 are disposed on a first straight line S1 (see FIG. 19) crossing the first through-hole 421.

When the first slider 431 and the second slider 432 move to the retreat position where the first through-hole 421 is opened, since the first slider 431 and the second slider 432 rotate along with the rotating unit 420, the first slider 431 and the second slider 432 are disposed on a second straight line S2 crossing the first through-hole 421. The first straight line S1 and the second straight line S2 respectively correspond to an X-axis direction and a Y-axis direction, and thus are perpendicular to each other.

Referring to FIG. 19, an optical path 490 is designed to have a substantially rectangular shape, and a width L2 in a horizontal direction (X-axis direction) is greater than a width in a vertical direction (Y-axis direction). Accordingly, an upper portion and a lower portion of the optical path 490 have a wider free space than a right portion and a left portion. Since the optical path adjusting device 410 uses the free space of the upper portion and the lower portion in the vertical direction, which corresponds to the shorter side of the optical path 490, when the first slider 431 and the second slider 432 move to the retreat position in FIGS. 17 through 19, a size occupied by the optical path adjusting device 410 may be minimized.

As described above, according to the one or more embodiments of the invention, since a photographing apparatus may block part of light or entirely pass light by opening an optical path by using an optical path adjusting device, a 2D image or a 3D image may be selectively captured.

Also, since a moving unit and optical units move by receiving a rotational force of a rotating unit, the optical units may conveniently move to an advance position for a 3D photographing mode or to a retreat position for a 2D photographing mode by using a compact structure. Accordingly, since a space needed to arrange and operate elements for moving the plurality of optical units for capturing a 3D image is minimized, the photographing apparatus may be designed to have a compact structure.

Also, since the optical units may move between the advance position and the retreat position, a sufficient amount of light may be secured in a 2D photographing mode.

Also, when magnetic portions are provided on a first slider and a second slider of the moving unit, a driving force needed to drive the first slider and the second slider and generated noise may be reduced. Since the magnetic portions enable the first slider and the second slider to attract each other when a 3D image is captured, a change in a position due to shaking caused by a backlash between mechanical elements coupled to the first slider and the second slider may be minimized.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development, and other functional aspects of the systems (and components of the individual operating components of the systems) may not be described in detail. Furthermore, the connecting lines or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An optical path adjusting device comprising:
    a rotating unit comprising
        a gear surface that is disposed in a circumferential direction and,
        a through-hole through which light passes and about which the rotating unit rotates;
    at least one moving unit movably disposed relative to the rotating unit and linearly movable between an advance position corresponding to the through-hole and a retreat position outside the through-hole, the moving unit comprising
        a first slider comprising a first linear gear that extends in a direction in which the first slider linearly moves, and
        a second slider comprising a second linear gear that extends in a direction in which the second slider linearly moves,
    wherein the first slider and second slider are movable toward each other or away from each other and close the through-hole at the advance position by contacting each other and open the through-hole at the retreat position by moving away from the through-hole;
    a transmitting unit disposed between the rotating unit and the moving unit, the transmitting unit comprising a first transmission gear that is coupled to and rotates between the gear surface and the first linear gear and a second transmission gear that is coupled to and rotates between the gear surface and the second linear gear,
    wherein the transmitting unit transmits a rotational force of the rotating unit to the moving unit; and
    an optical unit that is disposed on the moving unit and blocks at least part of light passing through the through-hole.

2. The optical path adjusting device of claim 1, further comprising a support unit that movably supports the first slider and the second slider.

3. The optical path adjusting device of claim 2, wherein the support unit comprises at least one stopper that limits motions of the first slider and the second slider.

4. An optical path adjusting device comprising:
    a rotating unit that comprises and rotates about a through-hole through which light passes;
    at least one moving unit that is movably disposed relative to the rotating unit and is linearly movable between an advance position corresponding to the through-hole and a retreat position outside the through-hole, the moving unit comprising a first slider and a second slider that are movable toward each other or away from each other,
    wherein the first slider and the second slider close the through-hole at the advance position by contacting each other and open the through-hole at the retreat position by moving away from the through-hole;
    a transmitting unit that is disposed between the rotating unit and the moving unit and transmits a rotational force of the rotating unit to the moving unit;
    an optical unit that is disposed on the moving unit and blocks at least part of light passing through the through-hole;
    a first magnetic portion that is disposed on the first slider; and
    a second magnetic portion that is disposed on the second slider and applies an attractive magnetic force to the first magnetic portion.

5. The optical path adjusting device of claim 4, further comprising a sensing unit that detects positions of the first slider and the second slider.

6. The optical path adjusting device of claim 1, further comprising:
    a driving unit that generates a driving force; and
    an intermediate gear that is coupled to the gear surface of the rotating unit and transmits the driving force of the driving unit to the rotating unit.

7. An optical path adjusting device comprising:
    a rotating unit comprising a plurality of long hole pairs each of which comprises a first long hole and a second long hole that extend outward in curves, and a through-hole through which light passes and about which the rotating unit rotates;
    at least one moving unit movably disposed relative to the rotating unit and linearly movable between an advance position corresponding to the through-hole and a retreat position outside the through-hole, the moving unit comprising a first slider and a second slider;
    a transmitting unit that is disposed between the rotating unit and the moving unit and transmits a rotational force of the rotating unit to the moving unit, the transmitting unit comprising a plurality of transmission plates that comprise a first sliding protrusion and a second sliding protrusion respectively coupled to the first long hole and the second long hole, and a third long hole extending in curves with respect to the first long hole and the second long hole;
    wherein the first slider and the second slider
        comprise third sliding protrusions that are inserted into the third long hole of each of the plurality of transmission plates,
        are movable toward each other or away from each other,
        close the through-hole at the advance position by contacting each other, and open the through-hole at the retreat position by moving away from the through-hole;
an optical unit that is disposed on the moving unit and blocks at least part of light passing through the through-hole; and
a transmission plate guide unit comprising a fourth long hole and a fifth long hole that extend outside the through-hole and slidably support the first sliding protrusion and the second sliding protrusion passing through the first long hole and the second long hole.

8. An optical path adjusting device comprising:
a rotating unit that comprises and rotates about a through-hole through which light passes;
a first slider and a second slider that are coupled to the rotating unit and are linearly movable relative to the rotating unit between an advance position corresponding to the through-hole and a retreat position outside the through-hole;
a fixing unit that rotatably supports the rotating unit and comprises guide portions that extend in curves in a circumferential direction outside the through-hole and guide protrusions of the first slider and the second slider; and
a plurality of optical units that are respectively disposed on the first slider and the second slider and block part of light passing through the through-hole,
wherein:
the first slider and the second slier are disposed on a first straight line crossing the through-hole at the advance position, and
the first slider and the second slider are disposed on a second straight line crossing the through-hole and the first straight line at the retreat position.

9. A photographing apparatus comprising:
an optical path adjusting device comprising:
a rotating unit comprising
a gear surface that is disposed in a circumferential direction, and
a through-hole through which light passes and about which the rotating unit rotates;
at least one moving unit movably disposed relative to the rotating unit and linearly movable between an advance position corresponding to the through-hole and a retreat position outside the through-hole, the moving unit comprising
a first slider comprising a first linear gear that extends in a direction in which the first slider linearly moves, and
a second slider comprising a second linear gear that extends in a direction in which the second slider linearly moves,
wherein the first slider and second slider are movable toward each other or away from each other and close the through-hole at the advance position by contacting each other and open the through-hole at the retreat position by moving away from the through-hole;
a transmitting unit disposed between the rotating unit and the moving unit, the transmitting unit comprising a first transmission gear that is coupled to and rotates between the gear surface and the first linear gear and a second transmission gear that is coupled to and rotates between the gear surface and the second linear gear;
wherein the transmitting unit transmits a rotational force of the rotating unit to the moving unit;
a plurality of optical units that are disposed on the moving unit and block at least part of light passing through the through-hole;
an imaging device that converts light passing through the optical path adjusting device into an electrical signal;
a control unit that performs photographing by controlling the imaging device, and selects and operates in a two-dimensional (2D) photographing mode in which one image introduced through the through-hole is captured when the moving unit is located at the retreat position or a three-dimensional (3D) photographing mode in which a plurality of images the plurality of optical units are captured when the moving unit is located at the advance position.

10. The photographing apparatus of claim 9, wherein:
the optical path adjusting device further comprises:
a driving unit that generates a driving force, and
an intermediate gear that is coupled to the gear surface of the rotating unit and transmits the driving force of the driving unit to the rotating unit,
the control unit selects and operates in the 2D photographing mode or the 3D photographing mode by controlling the driving unit.

11. A photographing apparatus comprising:
an optical path adjusting device comprising:
a rotating unit that comprises and rotates about a through-hole through which light passes;
at least one moving unit that is movably disposed relative to the rotating unit and is linearly movable between an advance position corresponding to the through-hole and a retreat position outside the through-hole;
a transmitting unit that is disposed between the rotating unit and the moving unit and transmits a rotational force of the rotating unit to the moving unit; and
a plurality of optical units that are disposed on the moving unit and block at least part of light passing through the through-hole;
an imaging device that converts light passing through the optical path adjusting device into an electrical signal;
a control unit that performs photographing by controlling the imaging device, and selects and operates in a two-dimensional (2D) photographing mode in which one image introduced through the through-hole is captured when the moving unit is located at the retreat position or a three-dimensional (3D) photographing mode in which a plurality of images the plurality of optical units are captured when the moving unit is located at the advance position;
a main body that receives the optical path adjusting device; and
an angle adjusting unit that rotates the optical path adjusting device relative to the main body,
wherein the control unit adjusts a rotational orientation of the optical path adjusting device relative to the main body by controlling the angle adjusting unit.

12. The photographing apparatus of claim 11, further comprising:
a rotation sensing unit that detects a rotational orientation of the main body,
wherein the control unit controls the angle adjusting unit based on a detection signal of the rotation sensing unit.

13. The optical path adjusting device of claim 4, wherein:
the optical unit comprises a first optical unit that is disposed on the first slider and a second optical unit that is disposed on the second slider; and
the first optical unit and the second optical unit pass light in different optical ranges.

14. The optical path adjusting device of claim 4, wherein:
the optical unit comprises a first liquid crystal device and a second liquid crystal device that are respectively disposed on the first slider and the second slider and operate by receiving an external signal to pass or block light;
the first liquid crystal device and the second liquid crystal device pass light therethrough at different times.

15. The photographing apparatus of claim 11, wherein:
the moving unit comprises a first slider and a second slider that are movable toward each other or away from each other; and
the first slider and the second slider close the through-hole at the advance position by contacting each other and open the through-hole at the retreat position by moving away from the through-hole.

16. The photographing apparatus of claim 11, wherein:
the optical unit comprises optical filters that pass light in different optical ranges; and
the photographing apparatus further comprises a light-dividing filter that is disposed in front of the imaging device and divides light introduced after passing through the optical unit.

17. The photographing apparatus of claim 11, wherein:
the optical unit comprises a first liquid crystal device and a second liquid crystal device that are respectively disposed on the first slider and the second slider and operate by receiving an external signal to pass or block light;
the first liquid crystal device and the second crystal device pass light therethrough at different times; and
the control unit captures a plurality of images by controlling the imaging device in connection with the different times at which the first liquid crystal device and the second liquid crystal device operate.

* * * * *